United States Patent
Park et al.

(10) Patent No.: US 10,433,355 B2
(45) Date of Patent: Oct. 1, 2019

(54) METHOD AND APPARATUS FOR PERFORMING RELAY DEVICE FUNCTION BY NAN PROXY SERVER IN WIRELESS COMMUNICATION SYSTEM

(71) Applicant: LG ELECTRONICS INC., Seoul (KR)

(72) Inventors: Hyunhee Park, Seoul (KR); Dongcheol Kim, Seoul (KR); Byungjoo Lee, Seoul (KR); Giwon Park, Seoul (KR); Taesung Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 96 days.

(21) Appl. No.: 15/736,700

(22) PCT Filed: Jun. 15, 2016

(86) PCT No.: PCT/KR2016/006325
§ 371 (c)(1),
(2) Date: Dec. 14, 2017

(87) PCT Pub. No.: WO2016/204497
PCT Pub. Date: Dec. 22, 2016

(65) Prior Publication Data
US 2019/0098680 A1 Mar. 28, 2019

Related U.S. Application Data

(60) Provisional application No. 62/180,037, filed on Jun. 15, 2015, provisional application No. 62/180,039, filed on Jun. 15, 2015.

(51) Int. Cl.
*H04W 76/14* (2018.01)
*H04L 29/08* (2006.01)
*H04W 88/18* (2009.01)

(52) U.S. Cl.
CPC ............. *H04W 76/14* (2018.02); *H04L 29/08* (2013.01); *H04W 88/182* (2013.01)

(58) Field of Classification Search
CPC ...... H04W 76/14; H04W 88/182; H04L 29/08
See application file for complete search history.

(56) References Cited

U.S. PATENT DOCUMENTS

2014/0254566 A1 9/2014 Qi et al.
2014/0321317 A1 10/2014 Kasslin et al.
(Continued)

*Primary Examiner* — Jianye Wu
(74) *Attorney, Agent, or Firm* — Dentons US LLP

(57) ABSTRACT

In the present specification, provided is a method for relaying, by a NAN proxy server, data communication in a wireless communication system. Here, the method for relaying data communication by an NAN proxy server may comprise the steps of: transmitting server capability attribute information of the NAN proxy server to a first NAN proxy client; receiving connection capability attribute information from the first NAN proxy client; transmitting proxy relay request attribute information to the first NAN proxy client; receiving proxy relay response attribute information from the first NAN proxy client; and performing scheduling for the first NAN proxy client and relaying data communication to the first NAN client. Here, the proxy relay request attribute information may be transmitted if information on a direct connection failure is included in the connection capability attribute information.

15 Claims, 16 Drawing Sheets

(56) References Cited

U.S. PATENT DOCUMENTS

| | | |
|---|---|---|
| 2014/0376519 A1 | 12/2014 | Yang et al. |
| 2015/0081840 A1 | 3/2015 | Patil et al. |
| 2015/0098388 A1 | 4/2015 | Fang et al. |
| 2016/0353269 A1* | 12/2016 | Kasslin ................ H04W 8/005 |
| 2019/0098680 A1* | 3/2019 | Park ....................... H04L 29/08 |

* cited by examiner

METHOD AND APPARATUS FOR PERFORMING RELAY DEVICE FUNCTION BY NAN PROXY SERVER IN WIRELESS COMMUNICATION SYSTEM

This application is the National Phase of PCT International Application No. PCT/KR2016/006325, filed on Jun. 15, 2016, which claims priorities under 35 U.S.C. 119(e) to U.S. Provisional Application No. 62/180,037, filed on Jun. 15, 2015, 62/180,039, filed on Jun. 15, 2015 and which are hereby incorporated by reference herein in their entirety.

TECHNICAL FIELD

The present specification relates to a wireless communication system, and more particularly, to a method for a NAN (neighbor awareness networking) proxy server to perform a role of a relay device in a wireless communication system and an apparatus therefor.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

Recently, various wireless communication technologies have been developed with the advancement of information communication technology. Among the wireless communication technologies, a wireless local area network (WLAN) is the technology capable of accessing the Internet by wireless in a home, a company or a specific service provided area through portable device such as a personal digital assistant (PDA), a laptop computer, a portable multimedia player (PMP), etc. based on a radio frequency technology.

DISCLOSURE OF THE INVENTION

Technical Tasks

One object of the present specification is to provide a method for a NAN proxy server to perform a role of a relay device in a wireless communication system and an apparatus therefor.

Another object of the present specification is to provide a method for a NAN terminal to perform roles of a proxy server and a proxy client in a wireless communication system.

The other object of the present specification is to provide a method for a NAN proxy server to relay communication of NAN proxy clients.

Technical Solution

According to an aspect of the present specification, provided herein a method of relaying data communication relayed by a NAN (neighbor awareness networking) proxy server in a wireless communication system, the method comprising: transmitting server capability attribute information of the NAN proxy server to a first NAN proxy client; receiving connection capability attribute information from the first NAN proxy client; transmitting proxy relay request attribute information to the first NAN proxy client; receiving proxy relay response attribute information from the first NAN proxy client; and performing scheduling on the first NAN proxy client and relaying data communication to the first NAN proxy client, wherein the proxy relay request attribute information is transmitted when information on a direct connection failure is contained in the connection capability attribute information.

According to another aspect of the present specification, provided herein is a neighbor awareness networking (NAN) proxy server relaying data communication in a wireless communication system, comprising: a reception module configured to receive information from an external device; a transmission module configured to transmit information to an external device; and a processor configured to control the reception module and the transmission module, wherein the processor is further configured to: control the transmission module to transmit server capability attribute information of the NAN proxy server to a first NAN proxy client, control the reception module to receive connection capability attribute information from the first NAN proxy client, control the transmission module to transmit proxy relay request attribute information to the first NAN proxy client, control the reception module to receive proxy relay response attribute information from the first NAN proxy client, perform scheduling on the first NAN proxy client and relay data communication to the first NAN proxy client, wherein the proxy relay request attribute information is transmitted when information on a direct connection failure is contained in the connection capability attribute information.

The followings may be commonly applied to the method and NAN device for relaying data communication in the wireless communication system.

In accordance with an embodiment of the present specification, the first NAN proxy client transmits a message for a direct connection to a second NAN proxy client based on the server capability attribute information, and wherein the information on the direct connection failure is contained in the connection capability attribute information when the first NAN proxy client fails to receive a response from the second NAN proxy client while the message is transmitted N times.

In accordance with an embodiment of the present specification, the N corresponds to a predetermined transmission count.

In accordance with an embodiment of the present specification, the server capability attribute information comprises information on NAN proxy clients registered at the NAN proxy server.

In accordance with an embodiment of the present specification, all information on NAN proxy clients of a first type among the NAN proxy clients are contained in the server capability attribute information, and wherein only information on a client ID and a service name of NAN proxy clients of a second type among the NAN proxy clients are contained in the server capability attribute information.

In accordance with an embodiment of the present specification, further the method further comprising: receiving a proxy client information request from the first NAN proxy client; and transmitting a proxy client information response to the first NAN proxy client, wherein the proxy client information response comprises all information on the NAN proxy clients of the second type.

In accordance with an embodiment of the present specification, the first type corresponds to a normal type and wherein the second type corresponds to a secure type.

In accordance with an embodiment of the present specification, proxy relay scheduling attribute information is transmitted to the first NAN proxy client when scheduling is performs on the first NAN proxy client.

In accordance with an embodiment of the present specification, the proxy relay scheduling attribute information comprises at least one selected from the group consisting of information on an attribute ID, information on a relay requester ID, information on a relay response ID, information on a scheduling random rank value, information on service start time, and information on a service interval.

In accordance with an embodiment of the present specification, the scheduling random rank value corresponds to a value determined based on an access category.

In accordance with an embodiment of the present specification, priority is determined based on the scheduling random rank value when a plurality of relay requestors request data relay to the NAN proxy server.

In accordance with an embodiment of the present specification, when the first NAN proxy client and a second NAN proxy client correspond to the relay requestors, if the scheduling random rank value of the first NAN proxy client is smaller than the scheduling random rank value of the second NAN proxy client, data relay for the first NAN proxy client is preferentially performed.

In accordance with an embodiment of the present specification, the service interval is determined based on the scheduling random rank value.

In accordance with an embodiment of the present specification, the data relay is completed when the NAN proxy server receives data from the first NAN proxy client based on the scheduling and transmits the received data to a second NAN proxy client.

Advantageous Effects

According to the present specification, it is able to provide a method for a NAN proxy server to perform a role of a relay device in a wireless communication system and an apparatus therefor.

According to the present specification, it is able to provide a method for a NAN terminal to perform roles of a proxy server and a proxy client in a wireless communication system.

According to the present specification, it is able to provide a method for a NAN proxy server to relay communication of NAN proxy clients.

According to the present specification, it is able to provide a method of relaying data communication when communication between NAN proxy clients is unavailable.

According to the present specification, it is able to provide a method of performing communication using a NAN proxy server when NAN proxy clients are unable to perform direct communication due to signal strength, a distance problem, and the like.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 8 is a diagram illustrating a discovery window, and the like;

BEST MODE

Mode for Invention

Figure 1:
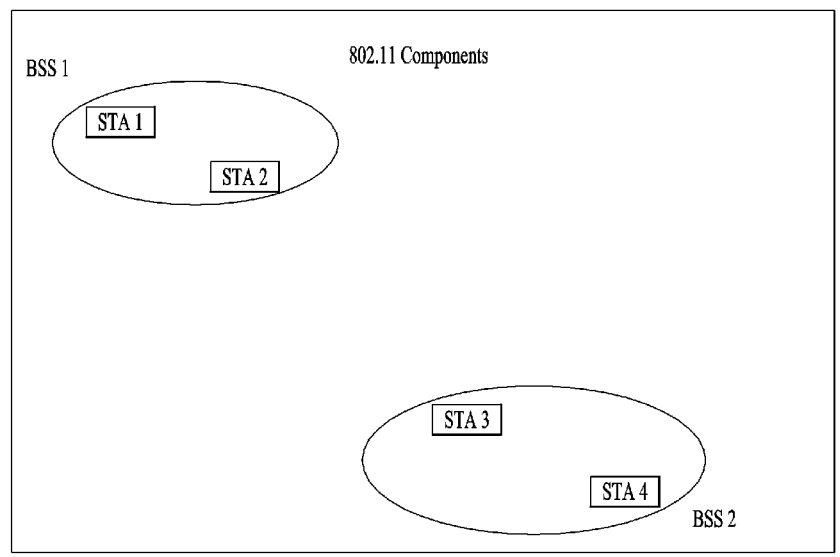
FIG. 1 is a diagram for an example of a structure of IEEE 802.11 system.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide the full understanding of the present invention. However, it will be apparent to those skilled in the art that the present invention may be implemented without such specific details.

The following embodiments can be achieved by combinations of structural elements and features of the present invention in prescribed forms. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Specific terminologies in the following description are provided to help the understanding of the present invention. And, these specific terminologies may be changed to other formats within the technical scope or spirit of the present invention.

Occasionally, to avoid obscuring the concept of the present invention, structures and/or devices known to the public may be skipped or represented as block diagrams centering on the core functions of the structures and/or devices. In addition, the same reference numbers will be used throughout the drawings to refer to the same or like parts in this specification.

The embodiments of the present invention can be supported by the disclosed standard documents disclosed for at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document can be supported by the above standard documents.

The following embodiments of the present invention can be applied to a variety of wireless access technologies, for example, CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc.

Although the terms such as "first" and/or "second" in this specification may be used to describe various elements, it is to be understood that the elements are not limited by such terms. The terms may be used to identify one element from another element. For example, a first element may be referred to as a second element, and vice versa within the range that does not depart from the scope of the present invention.

In the specification, when a part "comprises" or "includes" an element, it means that the part further comprises or includes another element unless otherwise mentioned. Also, the terms " . . . unit", " . . . module" disclosed in the specification means a unit for processing at least one function or operation, and may be implemented by hardware, software or combination of hardware and software.

For clarity, the following description focuses on IEEE 802.11 systems. However, technical features of the present invention are not limited thereto.

Structure of WLAN System

FIG. 1 is a diagram illustrating an exemplary structure of IEEE 802.11 system to which the present invention is applicable.

IEEE 802.11 structure may include a plurality of components and WLAN supportive of transparent STA mobility for an upper layer can be provided by interactions between the components. A basic service set (BSS) may correspond to a basic component block in IEEE 802.11 WLAN. FIG. 1 shows one example that two basic service sets BSS 1 and BSS 2 exist and that 2 STAs are included as members of each BSS. In particular, STA 1 and STA 2 are included in the BSS 1 and STA 3 and STA 4 are included in the BSS 2. In FIG. 1, an oval indicating the BSS can be understood as indicating a coverage area in which the STAs included in the corresponding BSS maintain communication. This area may be called a basic service area (BSA). Once the STA moves out of the BSA, it is unable to directly communicate with other STAs within the corresponding BSA.

A most basic type of BSS in IEEE 802.11 WLAN is an independent BSS (IBSS). For instance, IBSS can have a minimum configuration including 2 STAs only. Moreover, the BSS (e.g., BSS 1 or BSS 2) shown in FIG. 1, which has the simplest configuration and in which other components are omitted, may correspond to a representative example of the IBSS. Such a configuration is possible if STAs can directly communicate with each other. Moreover, the above-mentioned WLAN is not configured according to a devised plan but can be configured under the necessity of WLAN. And, this may be called an ad-hoc network.

If an STA is turned on/off or enters/escapes from a BSS area, membership of the STA in a BSS can be dynamically changed. In order to obtain the membership of the BSS, the STA can join the BSS using a synchronization procedure. In order to access all services of the BSS based structure, the STA should be associated with the BSS. This association may be dynamically configured or may include a use of a DSS (distribution system service).

Additionally, FIG. 1 shows components such as a DS (distribution system), a DSM (distribution system medium), an AP (access point) and the like.

In WLAN, a direct station-to-station distance can be restricted by PHY capability. In some cases, the restriction of the distance may be sufficient enough. However, in some cases, communication between stations located far away from each other may be necessary. In order to support extended coverage, the DS (distribution system) may be configured.

The DS means a structure in which BSSs are interconnected with each other. Specifically, the BSS may exist as an extended type of component of a network consisting of a plurality of BSSs instead of an independently existing entity as shown in FIG. 1.

The DS corresponds to a logical concept and can be specified by a characteristic of the DSM. Regarding this, IEEE 802.11 standard logically distinguishes a wireless medium (WM) from the DSM. Each of the logical media is used for a different purpose and is used as a different component. According to the definition of the IEEE 802.11 standard, the media are not limited to be identical to each other or to be different from each other. Since a plurality of the media are logically different from each other, flexibility of IEEE 802.11 WLAN structure (a DS structure or a different network structure) can be explained. In particular, the IEEE 802.11 WLAN structure can be implemented in various ways and the WLAN structure can be independently specified by a physical characteristic of each implementation case.

The DS can support a mobile device in a manner of providing seamless integration of a plurality of BSSs and logical services necessary for handling an address to a destination.

The AP enables associated STAs to access the DS through the WM and corresponds to an entity having STA functionality. Data can be transferred between the BSS and the DS through the AP. For instance, as shown in FIG. 1, while each of the STA 2 and STA 3 have STA functionality, the STA 2 and STA 3 provide functions of enabling associated STAs (STA 1 and STA 4) to access the DS. And, since all APs basically correspond to an STA, all APs correspond to an addressable entity. An address used by the AP for communication in the WM should not be identical to an address used by the AP for communication in the DSM.

Data transmitted from one of STAs associated with an AP to an STA address of the AP is always received in an uncontrolled port and the data can be processed by an IEEE 802.1X port access entity. Moreover, if a controlled port is authenticated, transmission data (or frame) can be delivered to a DS.

Layer Structure

Operations of the STA which operates in a wireless LAN system can be explained in terms of the layer structure. In terms of a device configuration, the layer structure can be implemented by a processor. The STA may have a structure of a plurality of layers. For example, a main layer structure handled in the 802.11 standard document includes a MAC sublayer and a physical (PHY) layer on a data link layer (DLL). The PHY layer may include a physical layer convergence procedure (PLCP) entity, a physical medium dependent (PMD) entity, etc. The MAC sublayer and the PHY layer conceptually include management entities called MAC sublayer management entity (MLME) and physical layer management entity (PLME), respectively. These entities provide a layer management service interface for performing a layer management function.

A station management entity (SME) is present within each STA in order to provide an accurate MAC operation. The SME is a layer-independent entity that may be considered as existing in a separate management plane or as being off to the side. Detailed functions of the SME are not specified in this document but it may be generally considered as being responsible for functions of gathering layer-dependent status from the various layer management entities (LMEs), setting values of layer-specific parameters similar to each other. The SME may perform such functions on behalf of general system management entities and may implement a standard management protocol.

The aforementioned entities interact with each other in various ways. For example, the entities may interact with each other by exchanging GET/SET primitives. The primitive means a set of elements or parameters related to a specific purpose. XX-GET.request primitive is used for requesting a value of a given MIB attribute (management information based attribute). XX-GET.confirm primitive is used for returning an appropriate MIB attribute value if a status is 'success', otherwise it is used for returning an error indication in a status field. XX-SET.request primitive is used to request that an indicated MIB attribute be set to a given value. If this MIB attribute implies a specific action, this requests that the action be performed. And, XX-SET.confirm primitive is used such that, if the status is 'success', this confirms that the indicated MIB attribute has been set to the requested value, otherwise it is used to return an error condition in the status field. If this MIB attribute implies a specific action, this confirms that the action has been performed.

Moreover, the MLME and the SME may exchange various MLME_GET/SET primitives through an MLME SAP (service access point). Furthermore, various PLME_GET/SET primitives may be exchanged between the PLME and the SME through PLME_SAP and may be exchanged between the MLME and the PLME through an MLME-PLME_SAP.

NAN (Neighbor Awareness Network) Topology

Figure 2:
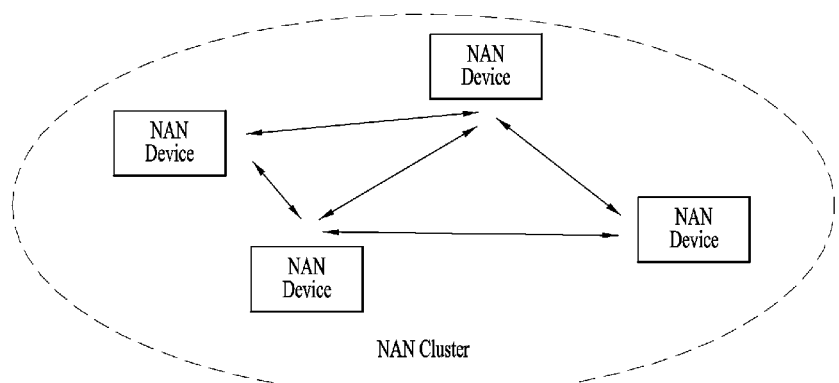
FIGS. 2 to 3 are diagrams for examples of a NAN cluster.
Figure 3:
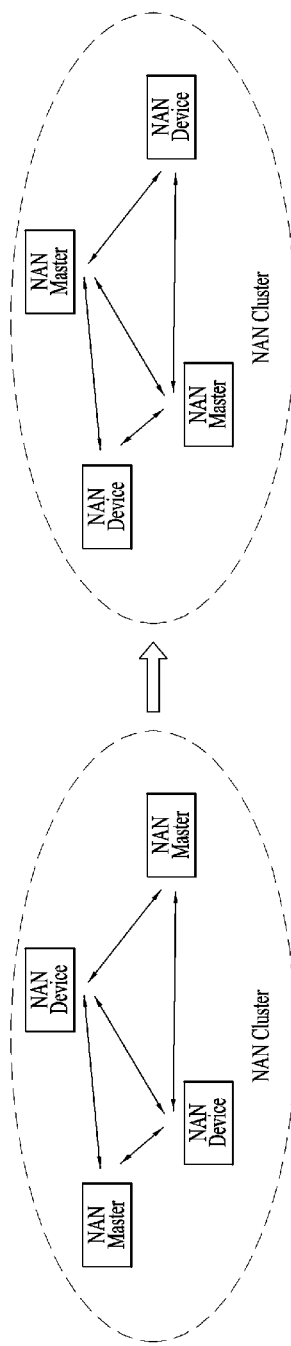

A NAN network can be constructed with NAN devices (devices) that use a set of identical NAN parameters (e.g., a time interval between consecutive discovery windows, an interval of a discovery window, a beacon interval, a NAN channel, etc.). A NAN cluster can be formed by NAN devices and the NAN cluster means a set of NAN devices that are synchronized on the same discovery window schedule. And, a set of the same NAN parameters is used in the NAN cluster. FIG. 2 illustrates an example of the NAN cluster. A NAN device included in the NAN cluster may directly transmit a multicast/unicast service discovery frame to a different NAN device within a range of the discovery window. As shown in FIG. 3, at least one NAN master may exist in a NAN cluster and the NAN master may be changed. Moreover, the NAN master may transmit all of a synchronization beacon frame, discovery beacon frame and service discovery frame.

NAN Device Architecture

Figure 4:
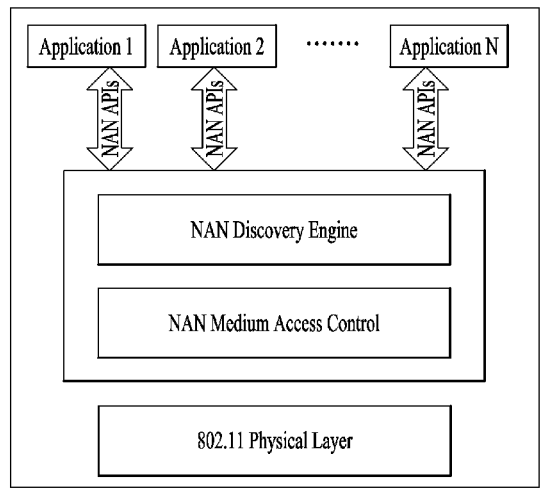
FIG. 4 is a diagram for an example of a structure of a NAN terminal.

FIG. 4 illustrates an example of a structure of a NAN device (device). Referring to FIG. 4, the NAN device is based on a physical layer in 802.11 and its main components correspond to a NAN discovery engine, a NAN MAC (medium access control), and NAN APIs connected to respective applications (e.g., Application 1, Application 2, . . . , Application N).

Figure 5:
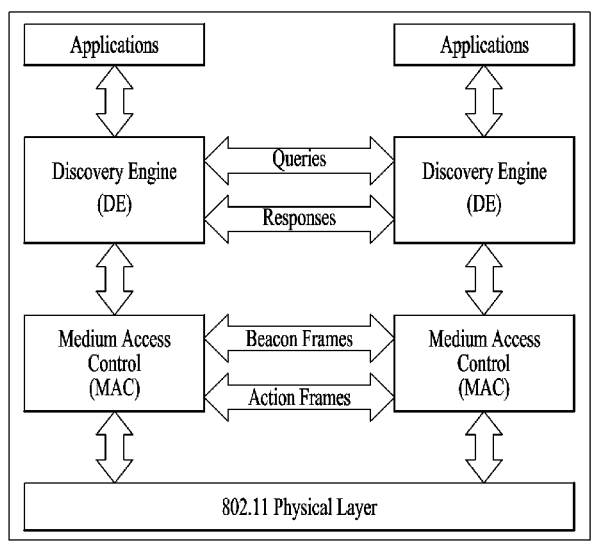
FIGS. 5 to 6 are diagrams illustrating a relation between NAN components.
Figure 6:
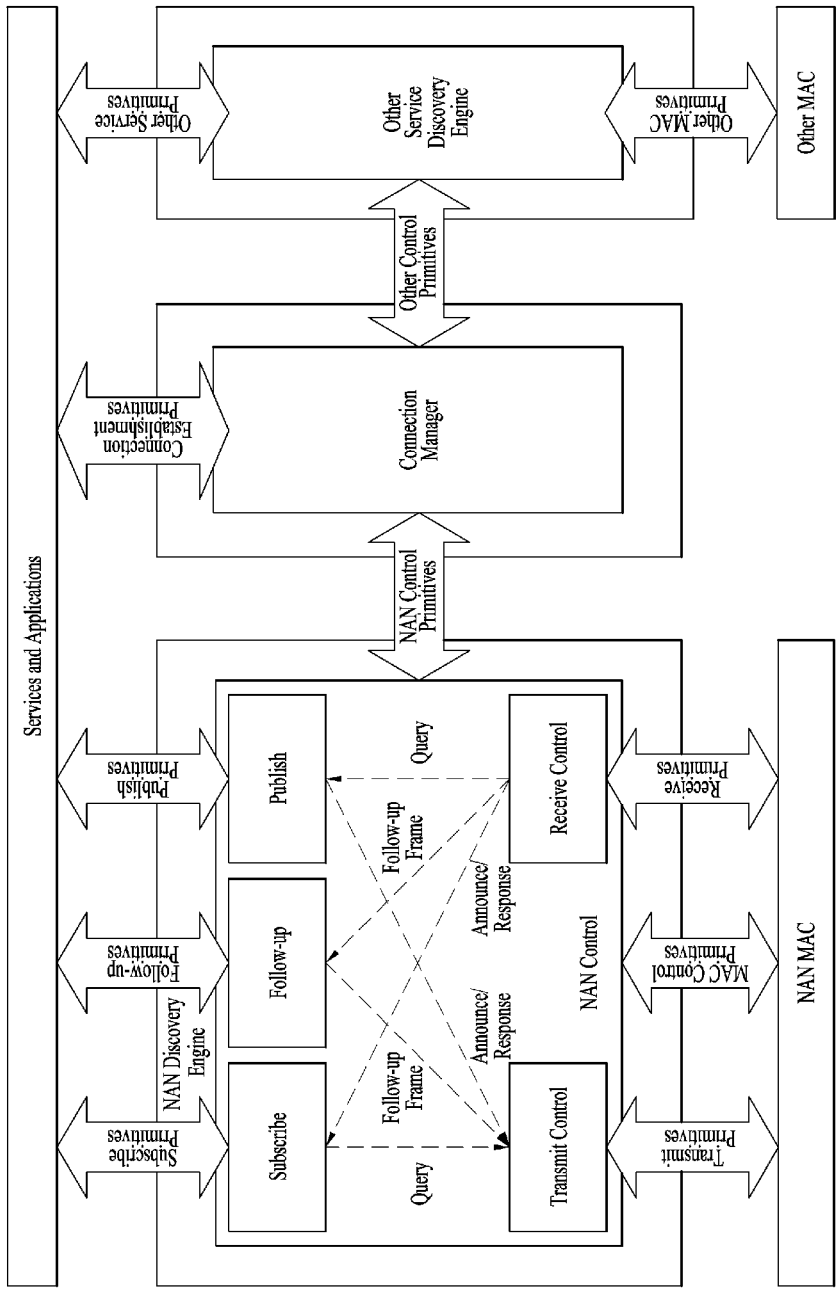

FIGS. 5 and 6 illustrate relations between NAN components. Service requests and responses are processed through the NAN discovery engine, and the NAN beacon frames and the service discovery frames are processed by the NAN MAC. The NAN discovery engine may provide functions of subscribing, publishing, and following-up. The publish/subscribe functions are operated by services/applications through a service interface. If the publish/subscribe commands are executed, instances for the publish/subscribe functions are generated. Each of the instances is driven independently and a plurality of instances can be driven simultaneously in accordance with the implementation. The follow-up function corresponds to means for the services/applications that transceive specific service information.

Role and State of NAN Device

Figure 7:
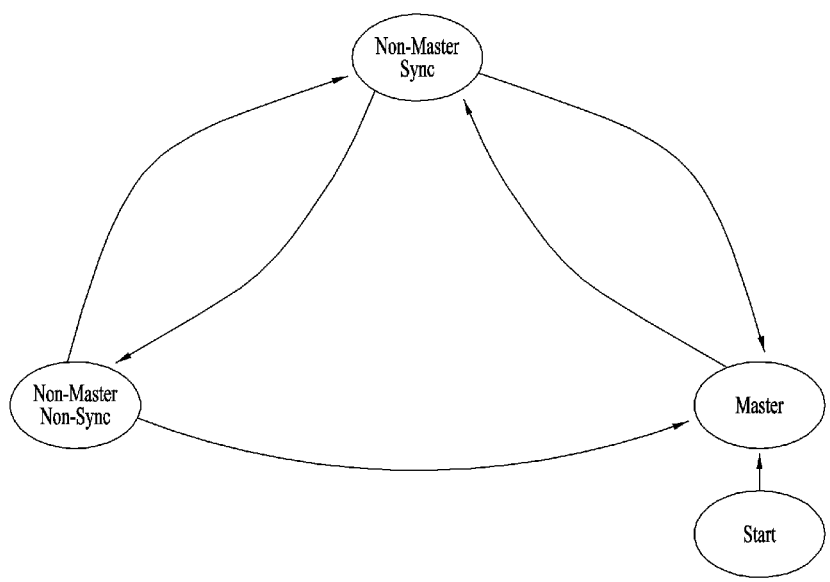
FIG. 7 is a diagram illustrating a state transition of a NAN terminal.

As mentioned in the foregoing description, a NAN device (device) can serve as a NAN master and the NAN master can be changed. In other words, roles and states of the NAN device can be shifted in various ways and related examples are illustrated in FIG. 7. The roles and states, which the NAN device can have, may include a master (hereinafter, the master means a state of master role and sync), a Non-master sync, and a Non-master Non-sync. Transmission availability of the discovery beacon frame and/or the synchronization beacon frame can be determined according to each of the roles and states and it may be set as illustrated in Table 1.

TABLE 11

| Role and State | Discovery Beacon | Synchronization Beacon |
| --- | --- | --- |
| Master | Transmission Possible | Transmission Possible |
| Non-Master Sync | Transmission Impossible | Transmission Possible |
| Non-Master Non-Sync | Transmission Impossible | Transmission Impossible |

The state of the NAN device can be determined according to a master rank (MR). The master rank indicates the preference of the NAN device to serve as the NAN master. In particular, a high master rank means strong preference for the NAN master. The NAN MR can be determined by Master Preference, Random Factor, Device MAC address, and the like according to Formula 1.

$$\text{MasterRank} = \text{MasterPreference} * 2^{56} + \text{RandomFactor} * 2^{48} + \text{MAC}[5] * 2^{40} + \ldots + \text{MAC}[0] \quad \text{[Formula 1]}$$

In Formula 1, the Master Preference, Random Factor, Device MAC address may be indicated through a master indication attribute. The master indication attributes may be set as illustrated in Table 2.

TABLE 2

| Field Name | Size (Octets) | Value | Description |
|---|---|---|---|
| Attribute ID | 1 | 0x00 | Identifies the type of NAN attribute. |
| Length | 2 | 2 | Length of the following field in the attribute |
| Master Preference | 1 | 0-255 | Information that is used to indicate a NAN Device's preference to serve as the role of Master, with a larger value indicating a higher preference. |
| Random Factor | 1 | 0-255 | A random number selected by the sending NAN Device. |

Regarding the above MR, in case of a NAN device that activates a NAN service and initiates a NAN cluster, each of the Master Preference and the Random Factor is set to 0 and NANWarmUp is reset. The NAN device should set a Master Preference field value in the master indication attribute to a value greater than 0 and a Random Factor value in the master indication attribute to a new value until when the NANWarmUp expires. When a NAN device joins a NAN cluster in which the Master Preference of an anchor master is set to a value greater than 0, the corresponding NAN device may set the Master Preference to a value greater than 0 and the Random Factor to a new value irrespective of expiration of the NANWarmUp.

Moreover, a NAN device can become an anchor master of a NAN cluster depending on an MR value. That is, all NAN devices have capabilities of operating as the anchor master. The anchor master means the device that has a highest MR and a smallest AMBTT (anchor master beacon transmit time) value and has a hop count (HC) (to the anchor master) set to 0 in the NAN cluster. In the NAN cluster, two anchor masters may exist temporarily but a single anchor master is a principle of the NAN cluster. If a NAN device becomes an anchor master of a currently existing NAN cluster, the NAN device adopts TSF used in the currently existing NAN cluster without any change.

The NAN device can become the anchor master in the following cases: if a new NAN cluster is initiated; if the master rank is changed (e.g., if an MR value of a different NAN device is changed or if an MR value of the anchor master is changed); or if a beacon frame of the current anchor master is not received any more. In addition, if the MR value of the different NAN device is changed or if the MR value of the anchor master is changed, the NAN device may lose the status of the anchor master. The anchor master can be determined according to an anchor master selection algorithm in the following description. In particular, the anchor master selection algorithm is the algorithm for determining which NAN device becomes the anchor master of the NAN cluster. And, when each NAN device joins the NAN cluster, the anchor master selection algorithm is driven.

If a NAN device initiates a new NAN cluster, the NAN device becomes the anchor master of the new NAN cluster. If a NAN synchronization beacon frame has a hop count in excess of a threshold, the NAN synchronization beacon frame is not used by NAN devices. And, other NAN synchronization beacon frames except the above-mentioned NAN synchronization beacon frame are used to determine the anchor master of the new NAN cluster.

If receiving the NAN synchronization beacon frame having the hop count equal to or less than the threshold, the NAN device compares an anchor master rank value in the beacon frame with a stored anchor master rank value. If the stored anchor master rank value is greater than the anchor master value in the beacon frame, the NAN device discards the anchor master value in the beacon frame. If the stored anchor master value is less than the anchor master value in the beacon frame, the NAN device newly stores values greater by 1 than the anchor master rank and the hop count included in the beacon frame and an AMBTT value in the beacon frame. If the stored anchor master rank value is equal to the anchor master value in the beacon frame, the NAN device compares hop counters. Then, if a hop count value in the beacon frame is greater than a stored value, the NAN device discards the received beacon frame. If the hop count value in the beacon frame is equal to (the stored value—1) and if an AMBTT value is greater than the stored value, the NAN device newly stores the AMBTT value in the beacon frame. If the hop count value in the beacon frame is less than (the stored value—1), the NAN device increases the hop count value in the beacon frame by 1. The stored AMBTT value is updated according to the following rules. If the received beacon frame is transmitted by the anchor master, the AMBTT value is set to the lowest four octets of time stamp included in the received beacon frame. If the received beacon frame is transmitted from a NAN master or non-master sync device, the AMBTT value is set to a value included in a NAN cluster attribute in the received beacon frame.

Meanwhile, a TSF timer of a NAN device exceeds the stored AMBTT value by more than 16*512 TUs (e.g., 16 DW periods), the NAN device may assume itself as an anchor master and then update an anchor master record. In addition, if any of MR related components (e.g., Master Preference, Random Factor, MAC Address, etc.) is changed, a NAN device not corresponding to the anchor master compares the changed MR with a stored value. If the changed MR of the NAN device is greater than the stored value, the corresponding NAN device may assume itself as the anchor master and then update the anchor master record.

Moreover, a NAN device may set anchor master fields of the cluster attributes in the NAN synchronization and discovery beacon frames to values in the anchor master record, except that the anchor master sets the AMBTT value to a TSF value of corresponding beacon transmission. The NAN device, which transmits the NAN synchronization beacon frame or the discovery beacon frame, may be confirmed that the TSF in the beacon frame is derived from the same anchor master included in the cluster attribute.

Moreover, a NAN device may adopt a TSF timer value in a NAN beacon received with the same cluster ID in the following case: i) if the NAN beacon indicates an anchor master rank higher than a value in an anchor master record of the NAN device; or ii) if the NAN beacon indicates an anchor master rank equal to the value in the anchor master record of the NAN device and if a hop count value and an AMBTT value in the NAN beacon frame are larger values in the anchor master record.

NAN Synchronization

NAN devices (devices) participating in the same NAN Cluster may be synchronized with respect to a common clock. A TSF in the NAN cluster can be implemented through a distributed algorithm that should be performed by all the NAN devices. Each of the NAN devices participating in the NAN cluster may transmit NAN synchronization beacon frame (NAN sync beacon frame) according to the above-described algorithm. The NAN device may synchronize its clock during a discovery window (DW). A length of the DW corresponds to 16 TUs. During the DW, one or more NAN devices may transmit synchronization beacon frames in order to help all NAN devices in the NAN cluster synchronize their own clocks.

NAN beacon transmission is distributed. A NAN beacon frame is transmitted during a DW period existing at every 512 TU. All NAN devices can participate in generation and transmission of the NAN beacon according to their roles and states. Each of the NAN devices should maintain its own TSF timer used for NAN beacon period timing. A NAN synchronization beacon interval can be established by the NAN device that generates the NAN cluster. A series of TBTTs are defined so that the DW periods in which synchronization beacon frames can be transmitted are assigned exactly 512 TUs apart. Time zero is defined as a first TBTT and the discovery window starts at each TBTT.

Figure 8:
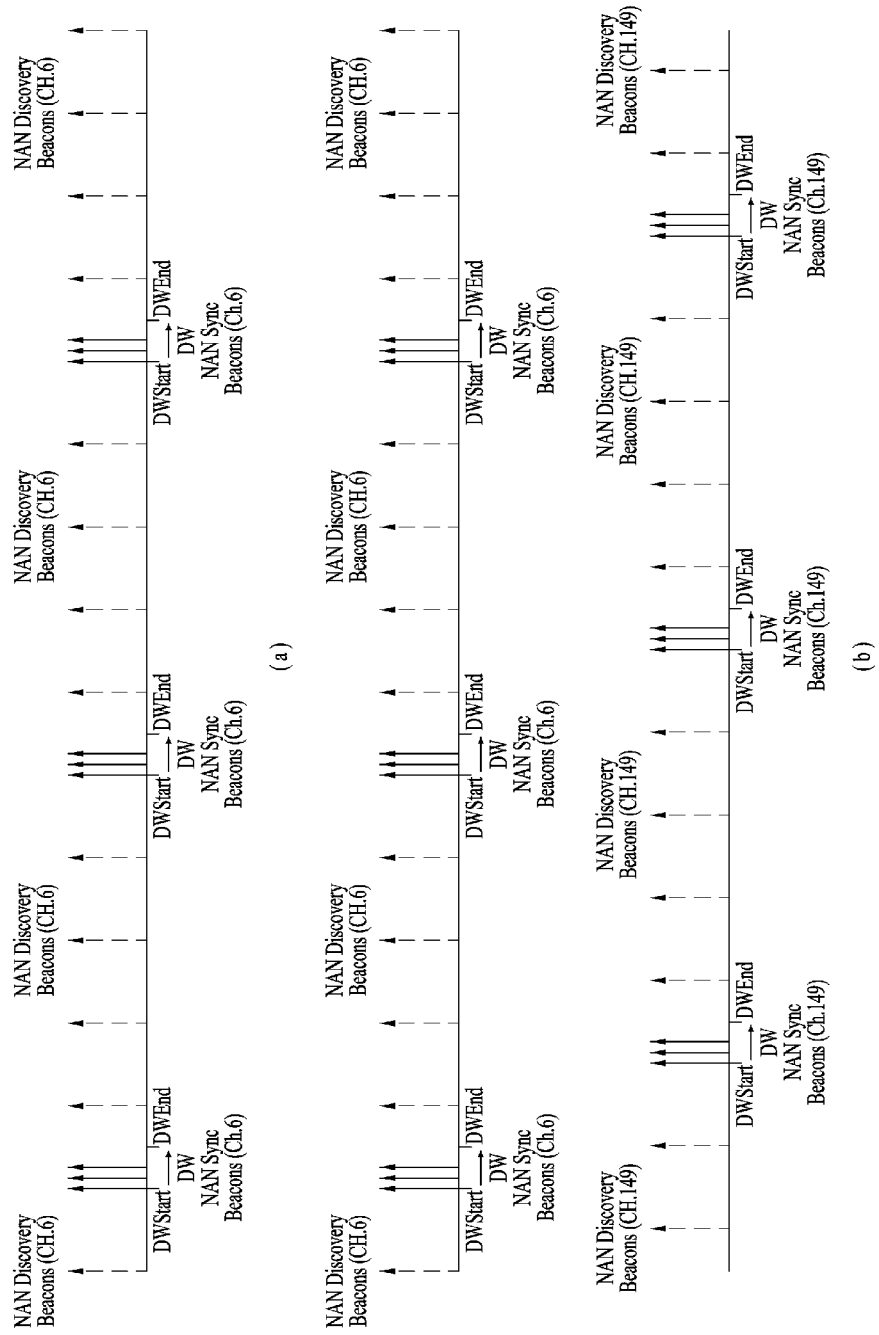

Each NAN device serving as a NAN master transmits a NAN discovery beacon frame from out of a NAN discovery window. On average, the NAN device serving as the NAN master transmits the NAN discovery beacon frame every 100 TUs. A time interval between consecutive NAN discovery beacon frames is smaller than 200 TUs. If a scheduled transmission time overlaps with a NAN discovery window of the NAN cluster in which the corresponding NAN device participates, the NAN device serving as the NAN master is able to omit transmission of the NAN discovery beacon frame. In order to minimize power required to transmit the NAN discovery beacon frame, the NAN device serving as the NAN master may use AC_VO (WMM Access Category—Voice) contention setting. FIG. 8 illustrates relations between a discovery window and a NAN discovery beacon frame and transmission of NAN synchronization/discovery beacon frames. Particularly, FIG. 8 (a) shows transmission of NAN discovery and synchronization beacon frames of a NAN device operating in 2.4 GHz band. FIG. 8 (b) shows transmission of NAN discovery and synchronization beacon frames of a NAN device operating in 2.4 GHz and 5 GHz bands.

Figure 9:
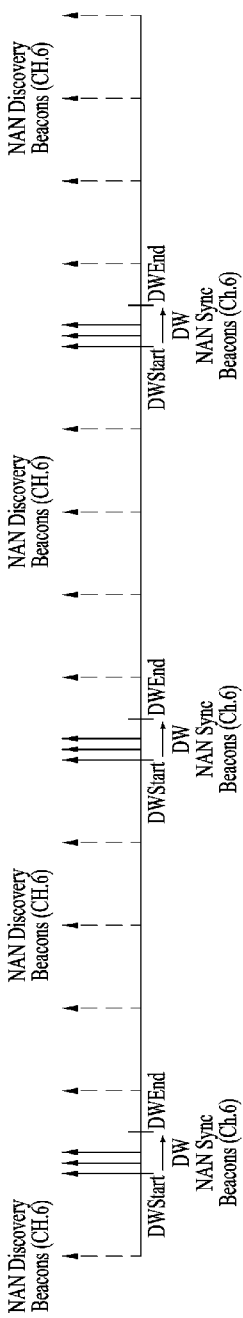
FIG. 9 is a diagram illustrating a discovery window.

FIG. 9 is a diagram illustrating a discovery window. As mentioned in the foregoing description, each NAN terminal performing a master role transmits a synchronization beacon frame within a discovery window and transmits a discovery beacon frame at the outside of the discovery window. In this case, as mentioned in the foregoing description, the discovery window can be repeated in every 512 TU. In this case, duration of the discovery window may correspond to 16 TUs. In particular, the discovery window can last during 16 TUs. In this case, for example, all NAN terminals belonging to a NAN cluster may awake at every discovery window to receive a synchronization beacon frame from a master NAN terminal. By doing so, the NAN cluster can be maintained. In this case, if all NAN terminals awake at every discovery window in a fixed manner, power consumption of the terminals may get worse. Hence, it is necessary to have a method of reducing power consumption by dynamically controlling duration of a discovery window while synchronization is maintained in a NAN cluster.

For example, as mentioned in the foregoing description, a NAN terminal may operate in 2.4 GHz band or 5 GHz band. As a different example, a NAN terminal may operate in sub 1 GHz band. For example, a NAN terminal can be configured to support IEEE 802.11ah that supports sub 1 GHz band. For example, if a NAN terminal supports 900 MHz, it may have link quality and a physical model different from link quality and a physical model in 2.4 GHz or 5 GHz.

For example, if a NAN terminal supports 900 MHz, the NAN terminal can send a signal farther and perform communication in a wider range. In this case, data communication can be performed between NAN terminals and data can be exchanged between NAN terminals. In this case, since the data exchange is performed based on the data communication, a problem may exist in efficiently managing power in the NAN terminal. In order to solve the problem, it may differently configure a method of configuring a discovery window period. FIG. 9 shows a basic structure that a synchronization beacon frame is transmitted within a discovery window and a discovery beacon frame is transmitted at the outside of the discovery window. The basic structure can also be similarly applied to a NAN terminal supporting 900 MHz band.

Figure 10:
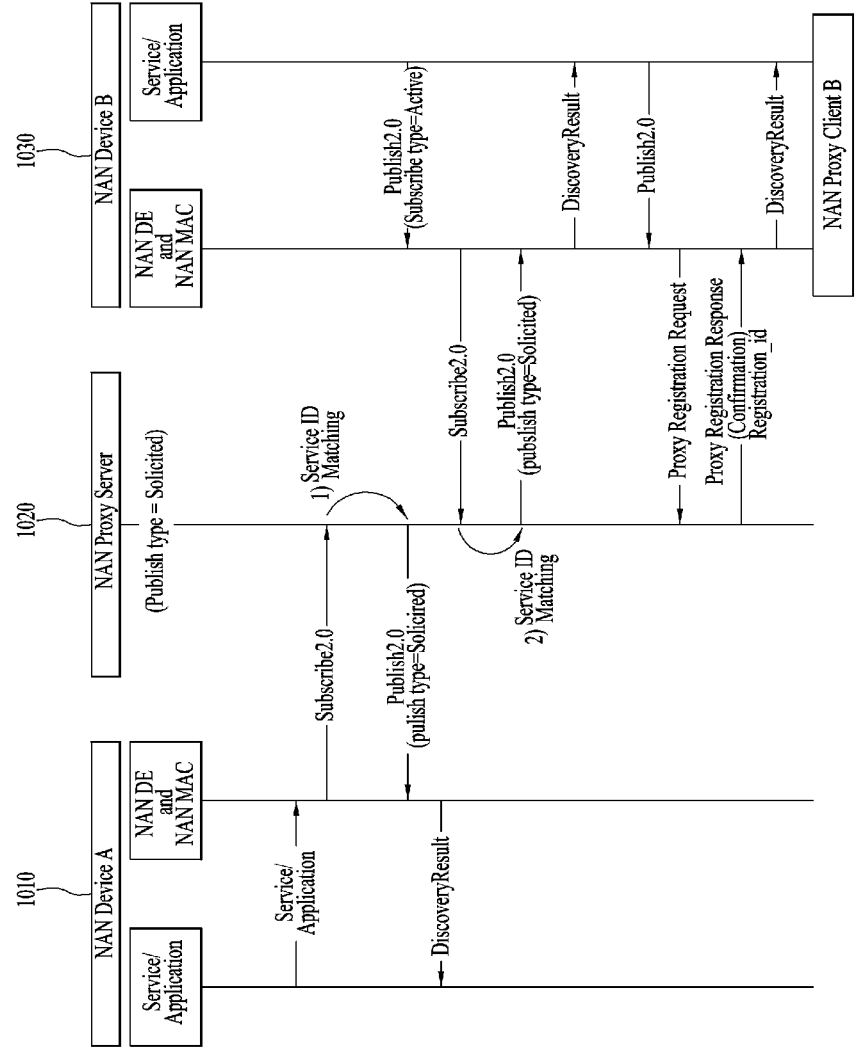
FIG. 10 is a diagram illustrating a method for a NAN terminal to register at a NAN proxy server as a NAN proxy client.

FIG. 10 is a diagram illustrating a method for a NAN terminal to register the NAN terminal at a NAN proxy server as a NAN proxy client.

As mentioned in the foregoing description, NAN terminals can perform data communication. A NAN terminal can receive a frame in a manner of being awaken in a discovery window. In this case, if the NAN terminal performs a procedure for performing data communication in a manner of being awaken in all discovery windows, considerable amount of power can be consumed.

Hence, in the following, a method of reducing power consumption of a NAN terminal is explained. For example, a NAN proxy terminal can be defined as a new role (concept) of the NAN terminal. For example, the NAN proxy terminal may correspond to a NAN proxy server or a NAN proxy client. In this case, the NAN proxy server can perform a procedure for performing data communication on behalf of the NAN proxy client. For example, the NAN proxy server can perform publish and/or subscribe on behalf of the NAN proxy client. More specifically, the NAN proxy server can provide information, which is provided to perform data communication with a different NAN terminal, to other NAN terminals on behalf of the NAN proxy client. In particular, the NAN proxy server can perform the procedure for performing data communication on behalf of the NAN proxy client to reduce power consumption of the NAN proxy client.

For example, the NAN proxy server may correspond to a terminal not sensitive to power consumption. And, the NAN proxy client may correspond to a terminal operating based on low power. In this situation, similar to a legacy NAN terminal, if the NAN proxy client awakes in every discovery window, since the NAN proxy client consumes a considerable amount of power, it may be difficult to use the NAN proxy client. Hence, it may make a terminal not sensitive to power consumption perform a procedure for performing data communication on behalf of the NAN proxy client to reduce power consumption and efficiently perform the data communication.

In this case, in order for the NAN proxy server to perform the procedure for performing the data communication on behalf of the NAN proxy client, it is necessary for the NAN proxy server to obtain information on the NAN proxy client. To this end, the NAN proxy client can be registered at the NAN proxy server. In the following, a method of registering the NAN proxy client at the NAN proxy server is described.

More specifically, a NAN terminal playing a role of a proxy server may correspond to a NAN proxy server. In this case, for example, the NAN proxy server can provide other NAN terminals with information indicating that the NAN proxy server is able to operate as a NAN proxy server. For example, the NAN proxy server can include information on a NAN proxy server role in a broadcasted message. In this case, other NAN terminals can identify the NAN proxy server based on the broadcasted message. And, for example, the NAN proxy server can provide other NAN terminals with the information on the NAN proxy server role using a publish message, by which the present invention may be non-limited.

If NAN terminals 1010/1030 recognize the NAN proxy server, the NAN terminals 1010/1030 can transmit a subscribe message to the NAN proxy server 1020 to find out a service of the NAN proxy server 1020.

More specifically, as mentioned in the foregoing description, the NAN terminals 1010/1030 may have a layered structure. In this case, for example, a service/application layer of a first NAN terminal (NAN device A, 1010) can provide a discovery engine (DE) and NAN MAC of the first NAN terminal 1010 with a subscribe method.

In this case, for example, primitives of the subscribe method provided to the NAN DE and the NAN MAC layers by the service/application layer can be represented as Table 3 in the following. In particular, the service/application layer can provide information on Table 3 to the NAN DE and the NAN MAC layers. More specifically, the service/application layer can provide information on a service name, service specific information, and a configuration parameter to be searched by a NAN terminal to the NAN DE and the NAN MAC layers.

And, other additional information can also be included in the primitives of the subscribe method, by which the present invention may be non-limited.

TABLE 3

Subscribe(service_name, service_specific_info, configuration_parameters)

- service_name:
UTF-8 name string which identifies the service/application
 - service_specific_info:
Sequence of values which further specify the published service beyond the service name
 - configuration_parameters
  • Subscribe type
  – Active
  • Query period
Recommended periodicity of query transmissions
  • Time to live
The instance of the Subscribe function can be commanded to run for a given time interval or until the first Discovery Result event Subsequently, the first NAN terminal 1010 can transmit a subscribe message to the NAN proxy server 1020. In particular, the first NAN terminal 1010 can transmit the subscribe message to the NAN proxy server 1020 based on the subscribe method as an active subscribe.

Subsequently, when the NA proxy server 1020 replies to the subscribe message, the NAN proxy server 1020 can transmit a publish message to the first NAN terminal 1010 by matching a service ID with a service capable of being provided by the NAN proxy server 1020. In this case, a Publish Type of the publish message may correspond to Solicited.

In this case, for example, the service/application layer of the NAN proxy server 1020 can provide a publish method to the NAN DE and NAN MAC layers of the NAN proxy server 1020. In this case, for example, primitives of the publish method can be represented as follows.

In particular, the service/application layer can provide information on Table 4 to the NAN DE and the NAN MAC layers. More specifically, the service/application layer can provide information on a service name, service specific information, and a configuration parameter supported by the NAN proxy server 1020 to the NAN DE and the NAN MAC layers.

In this case, Publish type information can be included in configuration information to indicate that solicited transmission is performed. And, Solicited transmission type information can also be included in the configuration information to indicate whether or not the solicited transmission corresponds to unicast transmission or broadcast transmission. And, Time to live information can be included in the configuration information as information on time during which a publish function is performed. And, Event conditions information can be included in the configuration information to indicate whether or not an event is generated.

And, other additional information can also be included in the primitives of the publish method, by which the present invention may be non-limited.

TABLE 4

Publish( service_name, service_specific_info, configuration_parameters )

- service_name
UTF-8 name string which identifies the service/application
 - service_specific_info:
Sequence of values which should be conveyed to the Discovery Engine of a NAN Device that has invoked a Subscribe method corresponding to this Publish method.
 - configuration_parameters
  • Publish type:
  • Solicited transmissions only
  • Solicited transmission type:
  • Determines whether a solicited transmission is a unicast or a broadcast transmission
  • Time to live:
  • The instance of the Publish function can be commanded to
   run for a given time interval or for one transmission only
  • Event conditions:
  • Determines when Publish related events are generated. Events can be requested to be generated on each solicited transmission. Alternatively, no events are expected.

Subsequently, if the first NAN terminal 1010 receives a publish message, the NAN DE and the NAN MAC layers of the first NAN terminal 1010 can provide a discovery result as an event to the service/application layer of the first NAN terminal 1010. By doing so, the first NAN terminal 1010 can complete the service discovery of the NAN proxy server 1020.

In this case, for example, primitives of the discovery result event can be represented as Table 5 in the following.

More specifically, the NAN DE and the NAN MAC layers can provide the service/application layer with the discovery result event including subscribe id information that identifies a subscribe function, service_specific_info information corresponding to specific service information supported by the NAN proxy server, publish_id information corresponding to publish ID information, and Address information corresponding to address information of the proxy server.

And, other additional information can also be included in the primitives of the discovery result event, by which the present invention may be non-limited.

TABLE 5

Discovery Result( subscribe_id, service_specific_info, publish_id, address )

- subscribe_id:
As originally returned by the instance of the Subscribe function
 - service_specific_info:
Sequence of values which were decoded from a frame received from the Proxy server
 - publish_id:
Identifier for the instance of the published service on a remote Proxy server
 - Address:
NAN Interface Address of the Proxy Server And, the second NAN terminal (NAN device B, 1030) can discover a service of the NAN proxy server 1020 based on a method identical to the method of the first NAN terminal 1010. In this case, for example, the service discovery on the NAN proxy server 1020 can be individually performed by each of the NAN terminals 1010/1030.

In this case, for example, having completed the service discovery on the NAN proxy server 1020, a service/application layer of the second NAN terminal 1030 can provide a publish method to NAN DE and NAN MAC layers of the second NAN terminal 1030.

In this case, for example, primitives used for the second NAN terminal 1030 to register at the NAN proxy server can be defined as Table 6 and Table 7 in the following. More specifically, the service/application layer of the second NAN terminal 1030 can provide information on proxy registration to the NAN DE and the NAN MAC layers of the second NAN terminal 1030 according to Table 6 and Table 7 as a publish method. In particular, the second NAN terminal 1030 can provide the information on the proxy registration to the NAN DE and the NAN MAC layers of the second NAN terminal 1030 by reusing a legacy publish method and a subscribe method. In this case, for example, when the legacy publish method and the subscribe method are reused, information for registering at the proxy server rather than information of the second NAN terminal for publishing the second NAN terminal 1030 can be included in a service_specific_info field. In particular, the second NAN terminal 1030 may use a method of including the information on the registration by using the legacy publish method and the subscribe method formats as it is.

TABLE 6

Publish (service_name, service_specific_info, configuration_parameters )

– service_name:
UTF-8 name string which identifies the service/application
– service_specific_info:
Sequence of values which should be conveyed to the Discovery Engine of a NAN Device that has invoked a Subscribe method corresponding to this Publish method.
– configuration_parameters
• Publish type:
• Solicited transmissions only and Unsolicited transmission only
• Solicited transmission type:
• Determines whether a solicited transmission is a unicast or a broadcast transmission
• Announcement period:
• Recommended periodicity of unsolicited transmissions
• Time to live:
• The instance of the Publish function can be commanded to run for a given time interval or for one transmission only
• Event conditions:
• Determines when Publish related events are generated. Events can be requested to be generated on each solicited transmission. Alternatively, no events are expected.

TABLE 7

Subscribe ( service_name, service_specific_info, configuration_parameters )

– service_name
UTF-8 name string which identifies the service/application
– service_specific_info:
Sequence of values which should be conveyed to the Discovery Engine of a NAN Device that has invoked a Subscribe method corresponding to this Publish method.
– configuration_parameters
• Subscribe type:
• Determines the type of Subscribe as follows
• Passive: NAN device can passively subscribe to internal NAN DE.
• Active: NAN device can actively subscribe to proxy server.

TABLE 7-continued

Subscribe ( service_name, service_specific_info, configuration_parameters )

• Discovery range:
• Determines whether the service is searched in close proximity only or in any NAN Devices within range
• Query period:
• Recommended periodicity of query transmissions
• Time to live:
• The instance of the Subscribe function can be commanded to run for a given time interval or until the first Discovery Result event Recommended periodicity of unsolicited transmissions As a different example, the second NAN terminal 1030 can newly define and use primitives for a method called for registration. In particular, the service/application layer of the second NAN terminal 1030 can provide information on proxy registration by providing a newly defined proxy registration method to the NAN DE and the NAN MAC layers of the second NAN terminal 1030. In this case, primitives of the newly defined proxy registration method can be represented as Table 8 in the following.

TABLE 8

ProxyRegistartion(service_name,service_specific_info, configuration_parameters)

– service_name:
UTF-8 name string which identifies the service/application
– service_specific_info:
Sequence of values which should be conveyed to the Discovery Engine of a NAN Device that has invoked a Subscribe method corresponding to this ProxyRegistration method.
– configuration_parameters
• ProxyRegistration type:
• Solicited transmissions only and Unsolicited transmission
• Solicited transmission type:
• Determines whether a solicited transmission is a unicast or a broadcast transmission
• Announcement period:
• Recommended periodicity of unsolicited transmissions
• Time to live:
• The instance of the Publish function can be commanded to run for a given time interval or for one transmission only
• Event conditions:
• Determines when ProxyRegistration related events are generated. Events can be requested to be generated on each solicited transmission. Alternatively, no events are expected.

In particular, the service/application layer of the second NAN terminal 1030 can provide a method for registering at the NAN proxy server to the NAN DE and the NAN MAC. In this case, the method may correspond to a method using a legacy publish method format and the method including information on proxy registration. And, for example, the method may correspond to a method newly defined for proxy registration, by which the present invention may be non-limited.

Subsequently, the NAN DE and the NAN MAC layers of the second NAN terminal 1030 can transmit a proxy registration request to the NAN proxy server 1020. In this case, the proxy registration request may correspond to a publish message. For example, the proxy registration request may correspond to a publish type as a service discovery frame. In this case, a service discovery attribute for the proxy registration request can be represented as Table 9 in the following.

TABLE 9

| Field | Size (Octets) | Value (Hex) | Description |
|---|---|---|---|
| Attribute ID | 1 | 0x03 | Identifies the type of NAN attribute |
| Length | 2 | Variable | Length of the following fields in the attribute. |
| Service ID* | 6 | Variable | Mandatory field that contains the hash of the Service Name. |
| Instance ID | 1 | Variable | Publish_ID or Subscribe_ID |
| Requestor Instance ID | 1 | Variable | Instance ID from the frame that triggered the transmission if available, otherwise set to 0x00. |
| Service Control | 1 | Variable | Mandatory field that defines the Service Control bitmap |
| Binding Bitmap | 0 or 2 | 0x0000 to0xFF FF | Optional field that indicates the binding of the SDA to post discovery connection attributes |
| Service Response Filter Length | 0 or 1 | Variable | An optional field and present if a service response filter is used. |
| Service Response Filter | Variable | Variable | An optional field that is a sequence of length and value pairs that identify the matching service response filters |
| Service Info Length | 0 or 1 | Variable | An optional field and present if service specific information is used |
| Service Info | Variable | Variable | An optional field that contains the service specific information. Its content may be determined by the application and not specified herein. |

In this case, for example, a service ID field can be mandatorily included in fields described in the following included in the proxy registration request. In this case, the service ID field can be defined by a proxy service ID corresponding to a service provided by the NAN proxy server. And, a proxy registration request field can include information necessary for a NAN terminal to register at the NAN proxy server. In this case, for example, a service info field corresponding to a field included in the proxy registration request can include a proxy request TLV (proxy registration request TLV). In this case, the proxy request TLV can be represented as Table 10 in the following. In this case, for example, the proxy request TLV can include an availability time field indicating DW duration during which a NAN terminal awakes after being registered as a proxy client. And, the proxy request TLV can also include a service ID field corresponding to an ID of a service requested by the NAN terminal to the NAN proxy server. Besides, the proxy request TLV can also include information necessary for the NAN terminal to register at the NAN proxy server, by which the present invention may be non-limited.

TABLE 10

| Field | Size (Octets) | Value (Hex) | Description |
|---|---|---|---|
| Type | 1 | Variable | Type code of the Proxy Registration Request TLV |
| Length | 2 | Variable | Length of the Proxy Registration Request TLV (not including the Type and Length fields) |
| Availability Time | 1 | Variable | Indicates bitmap for the DW Awake Duration of Proxy Client (DW could be presented from DW0 to DW15 with bitmap pattern) If bitmap bit is set as 0, Proxy Client is sleep, otherwise bitmap bit is set as 1, Proxy Client is awake, e.g., when DW awake duration is DW1 and DW2, bitmap is presented as 0110000000000000. |
| Time to live | 1 | Variable | Indicates TTL of Proxy client's service |
| Service ID | 6 | Variable | Indicates the requesting service ID |
| Instance ID | 1 | Variable | Publish_ID or Subscribe_ID |
| Requestor Instance ID | 1 | Variable | Instance ID from the frame that triggered the transmission if available, otherwise set to 0x00 |
| Service Control | 1 | Variable | Mandatory field that defines the Service Control bitmap |
| Binding Bitmap | 0 or 2 | 0x0000 to0xFF FF | Optional field that indicates the binding of the SDA to post discovery connection attributes |
| Service Response Filter Length | 0 or 1 | Variable | An optional field and present if a service response filter is used |

TABLE 10-continued

| Field | Size (Octets) | Value (Hex) | Description |
|---|---|---|---|
| Service Response Filter | Variable | Variable | An optional field that is a sequence of length and value pairs that identify the matching service response filters |
| Service Info Length | 0 or 1 | Variable | An optional field and present if service specific information is used |
| Service Info | Variable | Variable | An optional field that contains the service specific information. Its content may be determined by the application and not specified herein. |

Subsequently, the NAN proxy server can transmit a proxy response to the second NAN terminal 1030 in response to the proxy request. In this case, for example, the proxy response may correspond to a publish message. For example, the proxy registration response corresponds to a service discovery frame having a publish type. In this case, for example, a service discovery attribute for the proxy registration response can be represented as the aforementioned Table 9.

In this case, for example, a service ID field may correspond to a field mandatorily included in the fields described in the following included in the proxy registration response. In this case, the service ID field can be defined by a proxy service ID corresponding to a service provided by the NAN proxy server. The proxy registration response field can also include information necessary for a NAN terminal to register at the NAN proxy server. In this case, a service info field corresponding to a field included in the proxy registration response can include a proxy response TLV (proxy registration response TLV). In this case, the proxy response TLV can be represented as Table 11 in the following. In this case, for example, the proxy response TLV can include a status indication field indicating whether or not the NAN proxy server permits the registration of a NAN terminal. In this case, for example, if the status indication field corresponds to 0, it may indicate that the NAN proxy server permits the registration of the NAN terminal. And, if the status indication field corresponds to 1 or 2, it may indicate that the registration is denied base on a different reason. And, for example, the proxy response TLV can include a registration ID field indicating a registration ID. And, the proxy response TLV can include a service ID field corresponding to an ID of a service provided by the NAN proxy server. Besides, the NAN proxy response TLV can include information necessary for a NAN terminal to register at the NAN proxy server, by which the present invention may be non-limited.

TABLE 11

| Field | Size (Octets) | Value (Hex) | Description |
|---|---|---|---|
| Type | 1 | Variable | Type code of the Proxy Registration Response TLV |
| Length | 2 | Variable | Length of the Proxy Registration Response TLV (not including the Type and Length fields) |
| Status indication | 1 | Variable | If set to 0, Proxy registration is accept, otherwise set to 1 is fail due to requested information not available, and set to 2 is fail due to bad request |
| Registration ID | 1 | Variable | Indicates the Registration ID of requested service |

TABLE 11-continued

| Field | Size (Octets) | Value (Hex) | Description |
|---|---|---|---|
| MAC Address of matched device | 6 | Variable | Indicates the MAC Address of service matched device on a remote NAN Device |
| Service ID | 6 | Variable | Responses the requesting service ID |
| Time to live | 1 | Variable | Indicates TTL of Proxy Server |
| Watchdog timer | 1 | Variable | Indicates Watchdog timer value |

Subsequently, if the NAN DE and the NAN MAC of the second NAN terminal 1030 receive a confirmation from the NAN proxy server, the NAN DE and the NAN MAC of the second NAN terminal 1030 can provide a discovery result event to the service/application layer. In this case, for example, if a proxy response of which the status indication field corresponds to 1 is received, it may indicate that a confirmation is completed. Subsequently, the second NAN terminal 1030 may become a NAN proxy client registered at the NAN proxy server based on the discovery result event.

A NAN terminal may become a NAN proxy client registered at the NAN proxy server via the aforementioned procedure.

Figure 11:
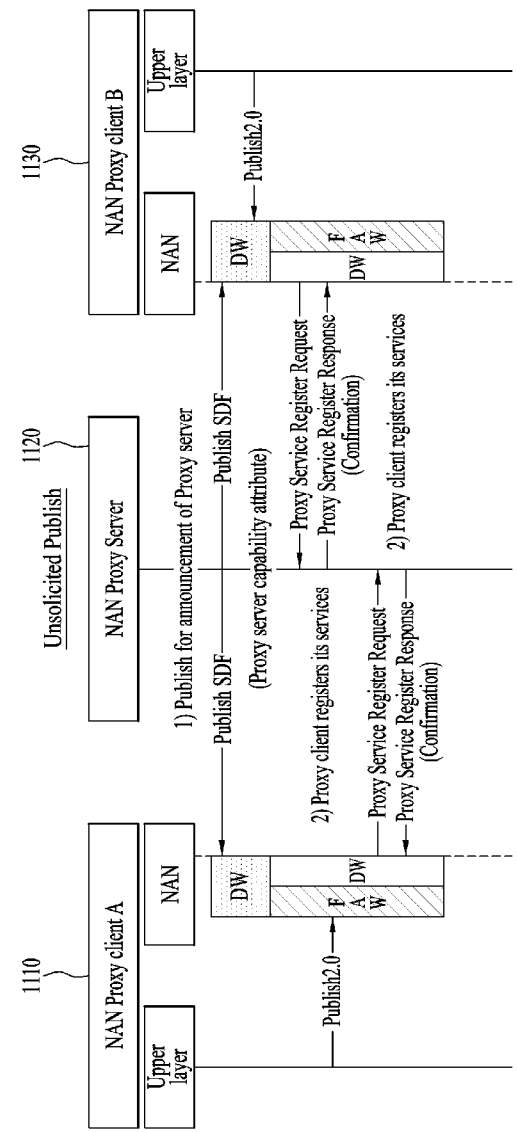
FIG. 11 is a diagram illustrating a method for a NAN terminal to register at a NAN proxy server as a NAN proxy client.

FIG. 11 is a diagram illustrating a method for a NAN terminal to register at a NAN proxy server as a NAN proxy client.

As mentioned in the foregoing description, the NAN terminal can perform a service discovery of the NAN proxy server by transmitting a subscribe message to the NAN proxy server. In this case, in order for the NAN terminal to transmit the subscribe message to the NAN proxy server, it is necessary to identify the NAN proxy server. In particular, it is necessary for the NAN terminal to check the existence of the NAN proxy server.

In this case, for example, the NAN proxy server can inform the NAN terminal of the existence of the NAN proxy server by publishing a service discovery frame by broadcasting the service discovery frame. In this case, the publishing may correspond to a solicited type or an unsolicited type.

Referring to FIG. 11, the NAN proxy server 1120 can transmit a publish message to NAN terminals using a unsolicited type. In this case, the publish message may correspond to a service discovery frame. Subsequently, the NAN terminals 1110/1130 can exchange a proxy service register request and a proxy service register response with the NAN server to register at the NAN server. This may be identical to FIG. 10.

For example, in order for the NAN proxy server to inform the NAN terminal of the capability of the NAN proxy server, the NAN proxy server can add a proxy server attribute within a NAN beacon frame or a service discovery frame. In this case, among NAN terminals, which have received the NAN beacon frame or the service discovery frame including the proxy server attribute, a terminal supporting a proxy client function interprets the proxy server attribute and may be then able to check the existence of the proxy server located near the terminal.

More specifically, Table 12 shows NAN attribute information capable of being included in the beacon frame and the service discovery frame. In this case, in Table 7, an attribute ID field can be defined by a different value to indicate a different attribute. And, for example, each of the attribute information may or may not be included in the beacon frame and the service discovery frame. And, for example, specific attribute information among the attribute information can be mandatorily included (represented by "M" in the table) in the beacon frame and the service discovery frame or can be optionally included (represented by "O" in the table) in the beacon frame and the service discovery frame.

In this case, it may be able to define at least one of a proxy server attribute field and a proxy client attribute field using a reserved bit belonging to the fields of the NAN attribute information. In this case, for example, the proxy server attribute field can be included in at least one selected from the group consisting of a NAN synchronization beacon frame, a NAN discovery beacon frame, and a NAN service discovery frame. In particular, the proxy server attribute field corresponds to a field defined by the NAN proxy server to notify the existence of the NAN proxy server. The proxy server attribute field can be selectively included in each of the frames.

On the contrary, the proxy client attribute field can be selectively included in the service discovery frame. In particular, the proxy client attribute field may correspond to information transmitted by a NAN terminal based on whether or not the NAN proxy server exists and whether or not the NAN terminal becomes a NAN proxy client. Hence, the proxy client attribute field is not transmitted to a NAN beacon frame and can be transmitted in a manner of being included in a NAN service discovery window.

address field including address information of a NAN interface of a proxy server. And, the proxy server attribute field can include a proxy server capability field as information on capability of the NAN proxy server. In this case, a function of the NAN proxy server can be included in a bitmap form. And, an awake interval of the NAN proxy server can be represented by a value of an integer form. In this case, the integer value corresponds to a discovery window period during which the NAN proxy server is awaked. In particular, if the integer value corresponds to 1, the NAN proxy server can awake in every discovery window period. In this case, for example, since the NAN proxy server plays a role of the NAN proxy client on behalf of the NAN proxy client, it is preferable that the NAN proxy server awakes in every discovery window.

And, for example, if it is necessary to reduce power consumption of the NAN proxy server, it may change the integer value, by which the present invention may be non-limited. If the NAN proxy server provides a function of an AP STA at the same time, it may include a BSSID field as the AP STA.

TABLE 13

| Field | Size (octets) | Value | Description |
| --- | --- | --- | --- |
| Attribute ID | 1 | 0x14 | Identifies the type of NAN attribute. (TBD) |
| Length | 2 | Variable | Length of the following fields in the attribute. |
| Proxy Server Address | 6 | Variable | NAN Interface address of NAN Proxy Server |
| Proxy Server Capability | 1 | Variable | Capability of Proxy Server |
| Awake Interval | 1 | 1-255 | DW interval of this Proxy Server |
| BSSID | 6 | Variable | BSSID which is support by Proxy Service if capable. |

And, a bitmap for the proxy server capability field can be represented as Table 14 in the following. More specifically, a publish proxy bit of the proxy server capability bitmap can

TABLE 12

| Attribute ID | Description | NAN Beacons Sync | NAN Beacons Discovery | NAN SDF |
| --- | --- | --- | --- | --- |
| 0 | Master Indication Attribute | YES/M | YES/M | NO |
| 1 | Cluster Attribute | YES/M | YES/M | NO |
| 2 | Service ID List Attribute | YES/O | YES/O | NO |
| 3 | Service Descriptor Attribute | NO | NO | YES/M |
| 4 | NAN Connection Capability Attribute | NO | NO | YES/O |
| 5 | WLAN Infrastructure Attribute | NO | NO | YES/O |
| 6 | P2P Operation Attribute | NO | NO | YES/O |
| 7 | IBSS Attribute | NO | NO | YES/O |
| 8 | Mesh Attribute | NO | NO | YES/O |
| 9 | Further NAN Service Discovery Attribute | NO | NO | YES/O |
| 10 | Further Availability Map Attribute | NO | NO | YES/O |
| 11 | Country Code Attribute | YES/O | YES/O | YES/O |
| 12 | Ranging Attribute | NO | NO | YES/O |
| 13 | Cluster Discovery Attribute | NO | NO | NO |
| 14 (TBD) | Proxy Server Attribute | YES/O | YES/O | YES/O |
| 15 (TBD) | Proxy Client Attribute | NO | NO | YES/O |
| 16-220 | Reserved | NA | NA | NA |
| 221 | Vendor Specific Attribute | YES/O | YES/O | YES/O |
| 222-255 | Reserved | NA | NA | NA |

In this case, the proxy server attribute field can be configured as Table 13 in the following. More specifically, the proxy server attribute field can include a proxy server indicate whether or not the NAN proxy server is able to transmit a service publish, which is proxied by receiving a publish request from a neighboring NAN terminal.

And, a subscribe proxy bit can indicate whether or not the NAN proxy server searches for a neighboring service by receiving a subscribe request from a neighboring NAN terminal and whether or not the NAN proxy server informs a NAN terminal of the searched service. And, a follow-up proxy bit can indicate whether or not a function of proxying a follow-up service discovery window of a neighboring NAN terminal is available. And, an invite proxy bit indicates whether or not a function of asking neighboring NAN terminals to participate in BSS of an AP STA of the NAN proxy server is available. And, a NAN data path can indicate whether or not the NAN proxy server supports a NAN data path function. And, a NAN data forwarding bit can indicate whether or not a function of receiving a NAN data path from a NAN terminal and forwarding the NAN data path to neighboring NAN terminals is available. In particular, the proxy server capability field can indicate information on the functions capable of being performed by the NAN proxy server, by which the present invention may be non-limited.

TABLE 14

| Bit(s) | Information | Notes |
| --- | --- | --- |
| 0 | Publish Proxy | Publish Proxy bit shall be set, if a Proxy server supports proxy a Publish request form Proxy client, and is set to 0 otherwise. |
| 1 | Subscribe Proxy | Subscribe Proxy bit shall be set, if a Proxy server supports proxy a Subscribe request form Proxy client, and is set to 0 otherwise. |
| 2 | Follow-up Proxy | Follow-up Proxy bit shall be set, if a Proxy server supports proxy a Follow-up request form Proxy client, and is set to 0 otherwise. |
| 3 | Invite Proxy | Follow-up Proxy bit shall be set, if a Proxy server supports to invite other NAN device to its own BSS, and is set to 0 otherwise. |
| 4 | NAN Data Path | NAN Data Path bit shall be set, if a Proxy server supports NAN data path capability, and is set to 0 otherwise. |
| 5 | NAN Data Forwarding | NAN Data Forwarding bit shall be set, if a Proxy server supports NAN data forwarding from a NAN device to other, and is set to 0 otherwise |
| 6-7 | Reserved | — |

And, for example, Table 15 in the following shows a format for a proxy client attribute. More specifically, the proxy client attribute can be included in a service discovery frame transmitted to the NAN proxy server by a NAN proxy client. In this case, for example, proxy client address corresponding to a NAN interface address of the NAN proxy client can be included in the proxy client attribute. And, proxy server address corresponding to a NAN interface address of the NAN proxy server can be included in the proxy client attribute. And, awake interval corresponding to an awake interval of a discovery window can be included in the proxy client attribute. In this case, the awake interval can indicate an awake interval of the NAN client in a unit of a discovery interval after the NAN proxy client requests publish, subscribe, and follow-up to the NAN proxy server.

TABLE 15

| Field | Size (octets) | Value | Description |
| --- | --- | --- | --- |
| Attribute ID | 1 | 0x15 | Identifies the type of NAN attribute. (TBD) |
| Length | 2 | Variable | Length of the following fields in the attribute. |
| Proxy Client Address | 6 | Variable | NAN Interface address of NAN device |
| Proxy Server Address | 6 | Variable | NAN Interface address of target NAN Proxy server |

TABLE 15-continued

| Field | Size (octets) | Value | Description |
| --- | --- | --- | --- |
| Awake Interval | 1 | Variable | Wake up interval of this Proxy Client (unit of DW interval) |
| BSSID | 6 | Variable | BSSID which is support by Proxy Service |

NAN terminals can register at the NAN proxy server via the aforementioned procedures. In this case, the NAN terminals registered at the NAN proxy server may correspond to NAN proxy clients.

Figure 12:
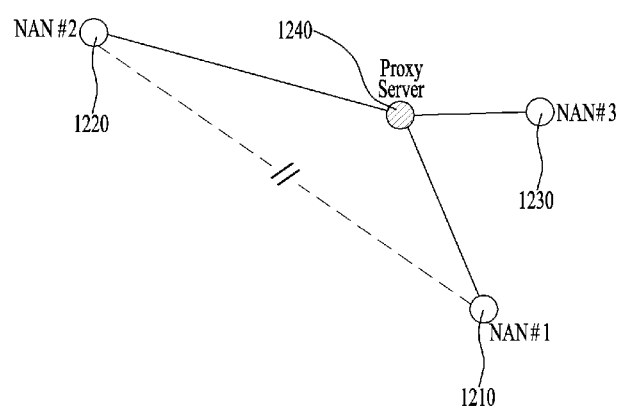
FIG. 12 is a diagram illustrating a method for a NAN proxy server to relay communication of NAN clients.

FIG. 12 is a diagram illustrating a method for a NAN proxy server to relay communication of NAN clients.

As mentioned in the foregoing description, NAN proxy clients may register at a NAN proxy server. In this case, for example, the NAN proxy clients can mutually identify whether or not the NAN proxy clients exist via the NAN proxy server. Yet, the NAN proxy clients may fail to perform direct communication due to signal strength, a distance problem, or the like.

More specifically, referring to FIG. 12, a first NAN proxy client 1210 and a second NAN proxy client 1220 may correspond to NAN terminals registered at a NAN proxy server 1240. In this case, the first NAN proxy client 1210 and the second NAN proxy client 1220 can mutually identify whether or not the first NAN proxy client 1210 and the second NAN proxy client 1220 exist via the NAN proxy server 1240. In particular, the first NAN proxy client 1210 belongs to the coverage of the NAN proxy server 1240 and the second NAN proxy client 1220 may belong to the coverage of the NAN proxy server 1240. Yet, the first NAN proxy client 1210 and the second NAN proxy client 1220 may fail to perform direct communication due to signal strength. And, for example, the first NAN proxy client 1210 and the second NAN proxy client 1220 may fail to perform direct communication due to a distance problem, an obstacle, or the like.

In particular, the first NAN proxy client 1210 and the second NAN proxy client 1220 may fail to perform direct communication due to various reasons, by which the present invention may be non-limited.

In this case, for example, the NAN proxy server 1240 provides information on a list of the NAN proxy clients 1210/1220 to the NAN proxy clients 1210/1220 only and may not know whether or not the NAN proxy clients 1210/1220 are able to establish a connection for data communication. When the NAN proxy server 1240 provides the information on the list of the NAN proxy clients 1210/1220 to the NAN proxy clients 1210/1220, if the NAN proxy clients 1210/1220 fail to perform direct communication, the NAN proxy clients 1210/1220 may not have a method capable of performing direct communication.

Hence, a method for the NAN proxy server 1240 to become a relay device and a method for the NAN proxy server 1240 to configure the NAN proxy clients 1210/1220 to perform scheduling for data communication are described in the following. In particular, the NAN proxy server 1240 can relay communication between the NAN proxy clients 1210/1220.

Figure 13:
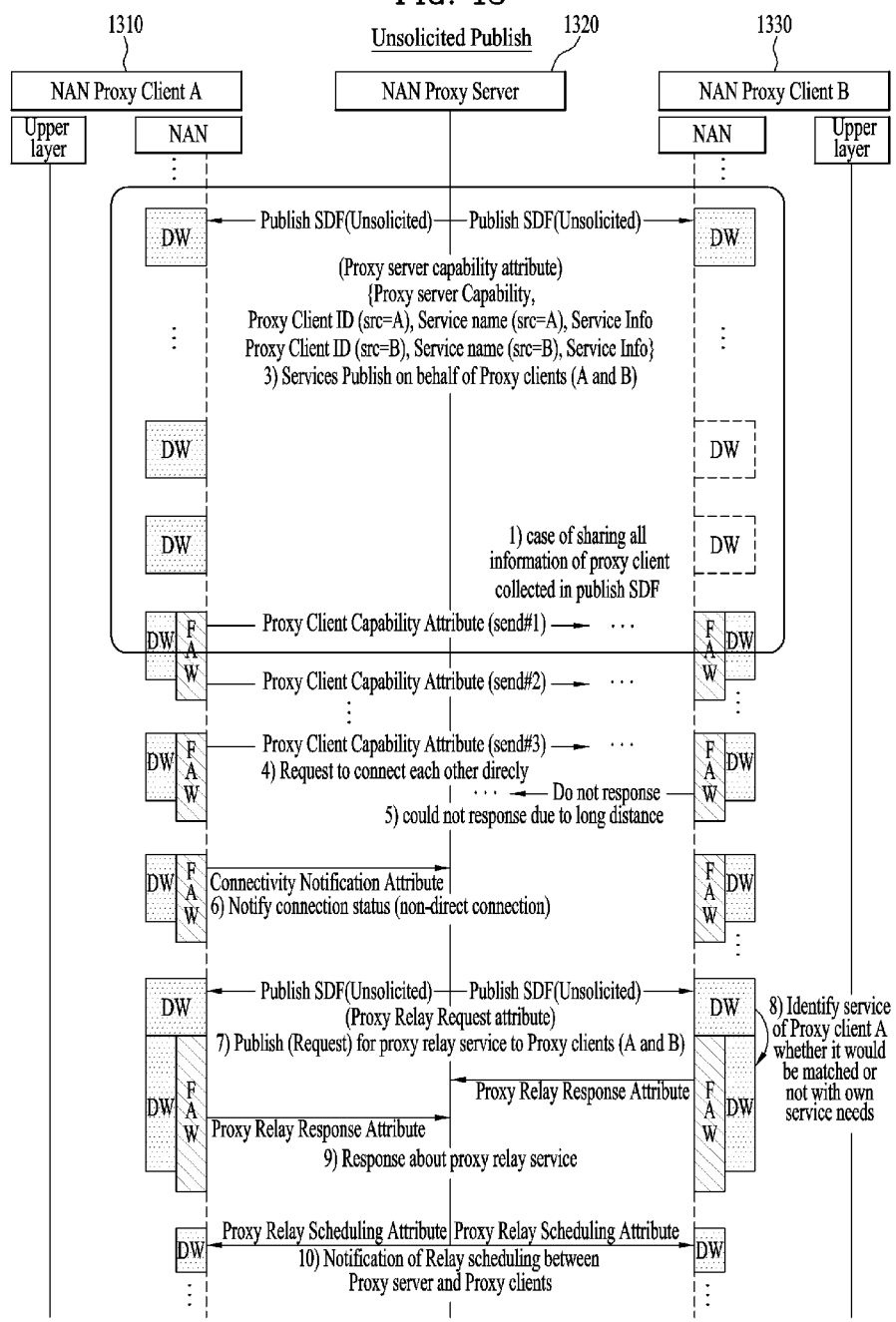
FIG. 13 is a diagram illustrating a method for a NAN proxy server to perform a role of a relay device.

FIG. 13 is a diagram illustrating a method for a NAN proxy server to perform a role of a relay device.

After NAN proxy clients are registered at a NAN proxy server, the NAN proxy server can still periodically transmit a publish message. In this case, the publish message may have a form of a service discovery frame. And, for example, the publish message can be transmitted in every discovery window or can be transmitted in every predetermined period. In this case, for example, a period of transmitting the publish message can be differently configured according to a service application. For example, when there are many NAN proxy clients and a service is actively performed, it is necessary to quickly update information of the service. To this end, the publish message can be transmitted in every discovery window. In particular, the period of transmitting the publish message can be differently configured based on a service application.

In this case, referring to FIG. 13, a publish type of a publish message transmitted by a NAN proxy server 1320 may correspond to an unsolicited type. And, as mentioned in the foregoing description, the publish message may correspond to a service discovery frame. In this case, as mentioned earlier in Table 13, the service discovery frame can include a proxy server attribute (or proxy server capability attribute).

In this case, if the NAN proxy server 1320 transmits the publish message of the unsolicited type, the proxy server attribute field can further include information on NAN proxy clients 1310/1330 registered at the NAN proxy server 1320. For example, the NAN proxy server 1320 can include information received from the NAN proxy clients 1310/1330 in the proxy server attribute field.

In this case, the proxy server attribute field can be configured by including at least one of fields included in Table 13. And, for example, the proxy server attribute field can further include at least one selected from the group consisting of a device ID (Proxy server) field, an instance ID field, a MAC interface field, a publish mode field, a subscribe mode field, a TBTT field, and a proxy server field.

And, for example, information on NAN proxy clients registered at the NAN proxy server 1320 can be included in the proxy server attribute field. In this case, for example, if a plurality of NAN proxy clients 1310/1330 are registered at the NAN proxy server 1320, information on all of a plurality of the NAN proxy clients 1310/1330 registered at the NAN proxy server can be included in the proxy server attribute field. In this case, for example, the information on the NAN proxy clients can be represented as Table 16 in the following. In particular, the publish message transmitted by the NAN proxy server 1320 can include information on the NAN proxy clients.

TABLE 16

- Etc
  – Registered Proxy Client ID #1,
  – Registered Proxy Client MAC interface #1,
  – Service info of Registered Proxy Client #1,
  – TBTT of Proxy Client #1,
  – Awake interval of Proxy Client #1,
- Etc
  – Registered Proxy Client ID #2,
  – Registered Proxy Client MAC interface #2,
  – Service info of Registered Proxy Client #2,
  – TBTT of Proxy Client #2,
  – Awake interval of Proxy Client #2, TABLE 16-continued .
.
.
- Etc
  – Registered Proxy Client ID #n,
  – Registered Proxy Client MAC interface #n,
  – Service info of Registered Proxy Client #n,
  – TBTT of Proxy Client #n,
  – Awake interval of Proxy Client #n And, the NAN proxy server 1320 can transmit the publish message including the proxy server attribute field in every discovery window by publishing the publish message. And, for example, the NAN proxy server 1320 can transmit the publish message including the proxy server attribute field in every specific discovery window based on a prescribed period by publishing the publish message. For example, a period of the publish message can be configured according to environment of NAN proxy clients near the NAN proxy server 1320. And, for example, the period of the publish message can be vendor-specifically configured according to a service application, by which the present invention may be non-limited.

In this case, the NAN proxy clients 1310/1330 can obtain a list of the NAN proxy clients and related information from the NAN proxy server 1320. In this case, the NAN proxy clients 1310/13330 may attempt to establish a direct connection with a NAN proxy client having a service preferred by the NAN proxy clients to perform data communication.

For example, referring to FIG. 13, a first NAN terminal 1310 (NAN proxy client A) can obtain information on NAN proxy clients from the NAN proxy server 1320. In this case, the first NAN terminal 1310 can recognize that a NAN terminal having a service preferred by the first NAN terminal corresponds to a second NAN terminal 1330 (NAN proxy client B). In this case, the first NAN terminal 1310 may attempt to establish a direct connection with the second NAN terminal 1330.

In this case, for example, the first NAN terminal 1310 can transmit a service discovery frame including proxy client capability attribute to the second NAN terminal 1330. In this case, for example, the proxy client capability attribute can include at least one field selected from the group consisting of a device ID (Proxy client) field, a device ID (Proxy server) field, an instance ID field, a MAC interface field, a service info field, and a TBTT field. In particular, the proxy client capability attribute can include NAN terminal-related information necessary for performing direct communication, by which the present invention may be non-limited.

And, for example, information necessary for the first NAN terminal to attempt to connect with the second NAN terminal 1330 can be further included in the service discovery frame. In this case, for example, the service discovery frame can further include service descriptor attribute shown in Table 17 and NAN connection capability attribute shown in Tables 18 and 19 in the following. In particular, information necessary for the first NAN terminal 1310 and the second NAN terminal 1330 to perform direct communication can be further included in the service discovery frame.

TABLE 17

| Field | Size (Octets) | Value (Hex) | Description |
| --- | --- | --- | --- |
| Attribute ID | 1 | 0x03 | Identifies the type of NAN attribute |
| Length | 2 | Variable | Length of the following fields in the attribute. |
| Service ID | 6 | Variable | Mandatory field that contains the hash of the Service Name. |

TABLE 17-continued

| Field | Size (Octets) | Value (Hex) | Description |
|---|---|---|---|
| Instance ID | 1 | Variable | Publish_ID or Subscribe_ID |
| Requestor Instance ID | 1 | Variable | Instance ID from the frame that triggered the transmission if available, otherwise set to 0x00. |
| Service Control | 1 | Variable | Mandatory field that defines the Service Control bitmap as defined in Error! Reference source not found. |
| Binding Bitmap | 0 or 2 | 0x0000 to 0xFFFF | Optional field that indicates the binding of the SDA to post discovery connection attributes |
| Matching Filter Length | 0 or 1 | Variable | An optional field and present if a matching service discovery filter is used |
| Matching Filter | Variable | Variable | An optional field that is a sequence of length and value pairs that identify the matching service discovery filters, refer to Error! Reference source not found. |
| Service Response Filter Length | 0 or 1 | Variable | An optional field and present if a service response filter is used. |
| Service Response Filter | Variable | Variable | An optional field that identifies the matching service response filters, refer to Error! Reference source not found. |
| Service Info Length | 0 or 1 | Variable | An optional field and present if service specific information is used |
| Service Info | Variable | Variable | An optional field that contains the service specific information. Its content may be determined by the application and not specified herein. |

TABLE 18

| Field | Size (octets) | Value | Description |
|---|---|---|---|
| Attribute ID | 1 | 0x04 | Identifies the type of NAN attribute. |
| Length | 2 | 2 | Length of the following fields in the attribute. |
| Connection Capability Bitmap | 2 | Variable | A set of parameters indicating NAN Device's connection capabilities, as defined in Table 19. |

TABLE 19

| Bit(s) | Information | Notes |
|---|---|---|
| 0 | Wi-Fi Direct | The Wi-Fi Direct field shall be set to 1 if the NAN Device supports Wi-Fi Direct, and is set to 0 otherwise. |
| 1 | Wi-Fi Direct Services | The Wi-Fi Direct Services field shall be set to 1 if the NAN Device supports Wi-Fi Direct Services, and is set to 0 otherwise. |
| 2 | TDLS | The TDLS field shall be set to 1 when the NAN Device supports TDLS, and is set to 0 otherwise. |
| 3 | WLAN Infrastructure | The WLAN Infrastructure field shall be set to 1 when the NAN Device currently connect to an WLAN Infrastructure AP, and is set to 0 otherwise. |
| 4 | IBSS | The IBSS field shall be set to 1 when the NAN Device supports IBSS, and is set to 0 otherwise. |
| 5 | Mesh | The Mesh field shall be set to 1 when the NAN Device supports Mesh, and is set to 0 otherwise. |
| 6-15 | Reserved | — |

In this case, for example, when the first NAN terminal 1310 transmits the service discovery frame including the proxy client capability attribute to the second NAN terminal 1330, it may set a limitation on the transmission count.

More specifically, as mentioned in the foregoing description, the first NAN terminal 1310 and the second NAN terminal 1330 may fail to establish a direct connection due to signal strength, a distance problem, and the like. In this case, the first NAN terminal 1310 may consistently transmit a service discovery frame including proxy capability client attribute to the second NAN terminal while not recognizing the abovementioned situation. If the first NAN terminal 1310 consistently transmits the service discovery frame, a power consumption problem may occur and it may correspond to an unnecessary procedure. Hence, the count of transmitting the service discovery frame including the proxy capability client attribute can be restricted. In this case, for example, the count of transmitting the service discovery frame including the proxy capability client attribute can be restricted to N. In this case, for example, the N may correspond to 3. In this case, the N can be differently configured according to situations of the NAN proxy server 1320 and the NAN proxy clients 1310/1330, by which the present invention may be non-limited.

In this case, when the first NAN terminal 1310 performs N number of transmission attempts, if the first NAN terminal fails to receive a response from the second NAN terminal 1330, the first NAN terminal can determine it as the first NAN terminal 1310 is unable to perform direct communication with the second NAN terminal 1330.

In this case, for example, the reason why the first NAN terminal fails to receive a response from the second NAN terminal is a distance, signal strength, an obstacle, and other reason. The reason is not restricted to a specific reason.

The first NAN terminal 1310 can transmit a service discovery frame including a connection notification attribute to the NAN proxy server 1320.

In this case, the connection notification attribute can include connection status information.

In particular, when the first NAN terminal 1310 performs predetermined number of transmission attempts, if the first NAN terminal fails to receive a response from the second NAN terminal 1330, the first NAN terminal 1310 can transmit information on a connection failure to the NAN proxy server 1320.

As a different example, the first NAN terminal 1310 can transmit a service discovery frame including connection capability info attribute to the NAN proxy server 1320 irrespective of whether or not transmission fails.

In this case, the connection capability info attribute can include at least one field selected from the group consisting of an attribute ID field, a device ID (proxy client A) field, a device (proxy client B) field, and a connection status field.

For example, if the first NAN terminal 1310 succeeds in establishing a direct connection with the second NAN terminal 1330, information on a connection success can be included in the connection status field. On the contrary, if the first NAN terminal 1310 fails to establish a connection with the second NAN terminal more than a prescribed transmission count (N), information on a connection failure can be included in the connection status field.

In particular, when the first NAN terminal 1310 establishes a direct connection with the second NAN terminal 1330, the first NAN terminal 1310 can provide information on a result of the direct connection to the NAN proxy server 1320.

If the NAN proxy server 1320 checks the information indicating that the first NAN terminal 1310 is unable to perform direct communication with the second NAN terminal 1320 via the connection status field, the NAN proxy server 1320 may play a role of a relay device.

In this case, the NAN proxy server can publish a service discovery frame including proxy relay request attribute to notify that the NAN proxy server plays a role of a relay device. In this case, a publish type may correspond to an unsolicited type. In particular, the NAN proxy server 1320 can transmit a publish message to the NAN proxy clients 1310/1330 in a form of a service discovery frame including proxy relay request attribute. In this case, for example, the proxy relay request attribute can include at least one from among information shown in Table 20 in the following.

TABLE 20

Proxy Relay Request Attribute

– Attribute ID
– Device ID (Proxy server)
– Relay requestor ID (Proxy client A)
– Relay receiver ID (Proxy client B)
– TBTT
– Awake Request
- Operating Channel In this case, for example, the NAN proxy server 1320 can notify that data communication is performed using a single channel dedicated to the NAN proxy server via the service discovery frame including proxy relay request attribute.

And, for example, the NAN proxy server 1320 can notify that data communication is performed in a channel capable of being used by supporting multi-channel via the service discovery frame including proxy relay request attribute, by which the present invention may be non-limited.

If the NAN proxy server 1320 transmits the service discovery frame including the proxy relay request attribute to the first NAN terminal 1310 and the second NAN terminal 1330, the first NAN terminal 1310 and the second NAN terminal 1330 can perform service matching. In particular, the first NAN terminal 1310 and the second NAN terminal 1330 can check whether or not data communication is performed on a service preferred by the first NAN terminal 1310 and the second NAN terminal 1330.

In this case, for example, if the NAN proxy clients 1310/1330 receive the service discovery frame including the proxy relay request attribute from the NAN proxy server 1320, the NAN proxy clients 1310/1330 can transmit a service discovery frame including a proxy relay response attribute to the NAN proxy server 1320.

In this case, for example, the proxy relay response attribute can include at least one of information shown in Table 21 in the following.

In this case, the NAN proxy clients 1310/1330 are able to know that the NAN proxy clients become a relay requestor and a relay receiver via IDs of the NAN proxy clients.

In this case, the NAN proxy clients 1310/1330 can check a relay requestor and a relay receiver via the IDs of the NAN proxy clients.

In this case, for example, if the first NAN terminal 1310 requests data communication to the second NAN terminal 1330, the first NAN terminal 1310 becomes a relay requestor. And, the second NAN terminal 1330 may become a relay receiver.

If a service for the proxy relay request attribute is not a service preferred by the NAN proxy clients 1310/1330, the NAN proxy clients 1310/1330 mark a failure on a relay status field and makes a response. In particular, the relay status field may indicate whether or not a relay role is necessary. In this case, if the relay status field indicates a failure, the NAN proxy server 1320 is unable to perform a role of a relay of the first NAN terminal 1310 and the second NAN terminal 1330.

On the contrary, if a service for the proxy relay request attribute corresponds to a service preferred by the NAN proxy clients 1310/1330, the NAN proxy clients 1310/1330 mark a success on the relay status field and makes a response. In this case, for example, a scheduling random rank value can be defined in the proxy relay response attribute.

When there exist a plurality of relay requestors, the scheduling random rank value can determine an order of relay requestors that perform data communication by accessing the NAN proxy server 1320. For example, if the scheduling random rank value is not defined, a plurality of the relay requestors may attempt to perform contention on a channel to access the NAN proxy server 1320. Regarding this, it shall be described later.

TABLE 21

Proxy Relay Response Attribute

– Attribute ID
– Relay Requestor/Receiver ID
– Scheduling Random Rank Value
- Relay Status The NAN proxy server 1320 can receive a proxy relay scheduling attribute allowing a relay role from the first NAN terminal 1310 and the second NAN terminal 1320, respectively. Subsequently, the NAN proxy server 1320 can determine scheduling for data communication between the first NAN terminal 1310 and the second NAN terminal 1320. In this case, the NAN proxy server 1320 can transmit a service discovery frame including a proxy relay scheduling attribute to the first NAN terminal 1310 and the second NAN terminal 1330 for the scheduling. In this case, the first NAN terminal 1310 and the second NAN terminal 1330 follow relay scheduling determined by the NAN proxy server based on information included in the proxy relay scheduling attribute. In this case, for example, the proxy relay scheduling attribute can include fields shown in Table 22 in the following.

TABLE 22

Proxy Relay Scheduling Attribute

– Attribute ID
– Device ID (Relay Requestor ID)
– Device ID (Relay Receiver ID)
– Scheduling Random Rank Value (Relay Requestor)
– Service Start Time
- Service Interval The first NAN terminal 1310 and the second NAN terminal 1330 can perform data communication via the relay scheduling determined by the NAN proxy server based on the information included in the proxy relay scheduling attribute.

And, for example, it may additionally define a proxy relay function in the NAN connection capability attribute mentioned earlier in Tables 18 and 19. In particular, it may define a proxy relay attribute in the NAN connection capability attribute which is included in a frame exchanged between NAN terminals. In this case, for example, Table 23 may correspond to a form which is defined by adding the proxy relay attribute to Table 19.

In particular, if a NAN terminal supports a proxy relay function, the NAN connection capability attribute field is included in a service discovery frame and the proxy relay attribute value of the NAN connection capability attribute field can be configured by 1.

if a NAN terminal supports a proxy relay function, ID information or address information of a NAN proxy server can be included in the proxy relay attribute. Other NAN terminals can obtain information on the NAN terminal supporting the proxy relay function via the proxy relay attribute.

Referring to Table 25, the proxy relay attribute field can further include a proxy relay control field. In this case, for example, the proxy relay control field can be represented as Table 26 in the following. More specifically, the proxy relay control field can include operating class field information corresponding to frequency information used by a NAN terminal when the NAN terminal performs a proxy relay function. And, the proxy relay control field can include channel number field information corresponding to channel number information used by a NAN terminal when the NAN terminal performs a proxy relay function. In this case, a channel number may correspond to a channel number to be used in an operating class.

TABLE 23

| Bit(s) | Information | Notes |
|---|---|---|
| 0 | Wi-Fi Direct | The Wi-Fi Direct field shall be set to 1 if the NAN Device supports Wi-Fi Direct, and is set to 0 otherwise. |
| 1 | Wi-Fi Direct Services | The Wi-Fi Direct Services field shall be set to 1 if the NAN Device supports Wi-Fi Direct Services, and is set to 0 otherwise. |
| 2 | TDLS | The TDLS field shall be set to 1 when the NAN Device supports TDLS, and is set to 0 otherwise. |
| 3 | WLAN Infrastructure | The WLAN Infrastructure field shall be set to 1 when the NAN Device currently connect to an WLAN Infrastructure AP, and is set to 0 otherwise. |
| 4 | IBSS | The IBSS field shall be set to 1 when the NAN Device supports IBSS, and is set to 0 otherwise. |
| 5 | Mesh | The Mesh field shall be set to 1 when the NAN Device supports Mesh, and is set to 0 otherwise. |
| 6 | Proxy Relay | The Proxy Relay field shall be set to 1 when the NAN Device supports Proxy Relay, and is set to 0 otherwise. |
| 7-15 | Reserved | — |

In this case, for example, a format of the proxy relay attribute field can be defined as Table 24 or Table 25 in the following.

More specifically, referring to Table 24, the proxy relay attribute field can include at least one selected from the group consisting of an attribute ID field, a length field, a proxy service ID field, a MAC address field, a map control field, and an availability intervals bitmap field. In particular, In particular, detail information on a NAN terminal performing a proxy relay function can be included in the proxy relay control field, by which the present invention may be non-limited.

And, for example, a map control field of the proxy relay attribute field can be defined as Table 27 in the following. The map control field can indicate duration information and the like, by which the present invention may be non-limited.

TABLE 24

| Field | Size (octets) | Value | Description |
|---|---|---|---|
| Attribute ID | 1 | 0x07 | Identifies the type of NAN attribute. |
| Length | 2 | Variable | Length of the following fields in the attribute. |
| Proxy Server ID | 6 | Variable | Indicates Proxy Server ID. |
| MAC Address | 6 | Variable | Device's Proxy server interface address |
| Map Control | 1 | Variable | The availability channel and time map control information, as defined in Table 4. |
| Availability Intervals Bitmap | Variable | Variable | The Availability Intervals Bitmap divides the time between the beginnings of consecutive Discovery Windows of a given NAN cluster into consecutive time intervals of equal durations. The time interval duration is specified by the Availability Interval Duration subfield of the Map Control field. A NAN Device that sets the i-th bit of the Availability Intervals Bitmap to 1 shall be present during the corresponding i-th time interval in the operation channel indicated by the associated Further Availability Map attribute. A NAN device that sets the i-th bit of the Availability Intervals Bitmap to 0 may be present during the corresponding i-th time |

TABLE 24-continued

| Field | Size (octets) | Value | Description |
|---|---|---|---|
| | | | interval in the operation channel indicated by the associated Further Availability Map attribute. |

TABLE 25

| Field | Size (octets) | Value | Description |
|---|---|---|---|
| Attribute ID | 1 | 0x07 | Identifies the type of NAN attribute. |
| Length | 2 | Variable | Length of the following fields in the attribute. |
| Proxy Server ID | 6 | Variable | Indicates Proxy Server ID. |
| MAC Address | 6 | Variable | Device's Proxy server interface address |
| Proxy Relay Control | 2 | Variable | Proxy Relay related information, as defined in Table 4. |
| Map Control | 1 | Variable | The availability channel and time map control information, as defined in Table 5. |
| Availability Intervals Bitmap | Variable | Variable | The Availability Intervals Bitmap divides the time between the beginnings of consecutive Discovery Windows of a given NAN cluster into consecutive time intervals of equal durations. The time interval duration is specified by the Availability Interval Duration subfield of the Map Control field. A NAN Device that sets the i-th bit of the Availability Intervals Bitmap to 1 shall be present during the corresponding i-th time interval in the operation channel indicated by the associated Further Availability Map attribute. A NAN device that sets the i-th bit of the Availability Intervals Bitmap to 0 may be present during the corresponding i-th time interval in the operation channel indicated by the associated Further Availability Map attribute. |

TABLE 26

| Bit(s) | Information | Notes |
|---|---|---|
| 0-1 | Operating Class | Indicating the frequency band the NAN Device will be available. The value is set as follows: 0: 2.4 GHz; 1: 5 GHz; 2: 900 MHz; 3: reserved |
| 2-9 | Channel number | Indicating the channel the NAN Device will be available |
| 10-15 | Reserved | — |

TABLE 27

| Bit(s) | Information | Notes |
|---|---|---|
| 0-3 | Map ID | Identifies the associated Further Availability Map attribute |
| 4-5 | Availability Interval Duration | Indicates the availability interval duration associated with the Availability Intervals Bitmap field. The value is set as follows: 0: 16 TU; 1: 32 TU; 2: 64 TU; 3: reserved |
| 6 | Repeat | 0: the signaled availability applies only to the time interval between the beginnings of two consecutive DWs, during which the corresponding attribute is received; 1: the signaled availability repeats for future intervals between DWs for 16 intervals, or until it is changed by a NAN Service Discovery frame that carries different availability information, whichever comes earlier. |
| 7 | Reserved | — |

Figure 14:
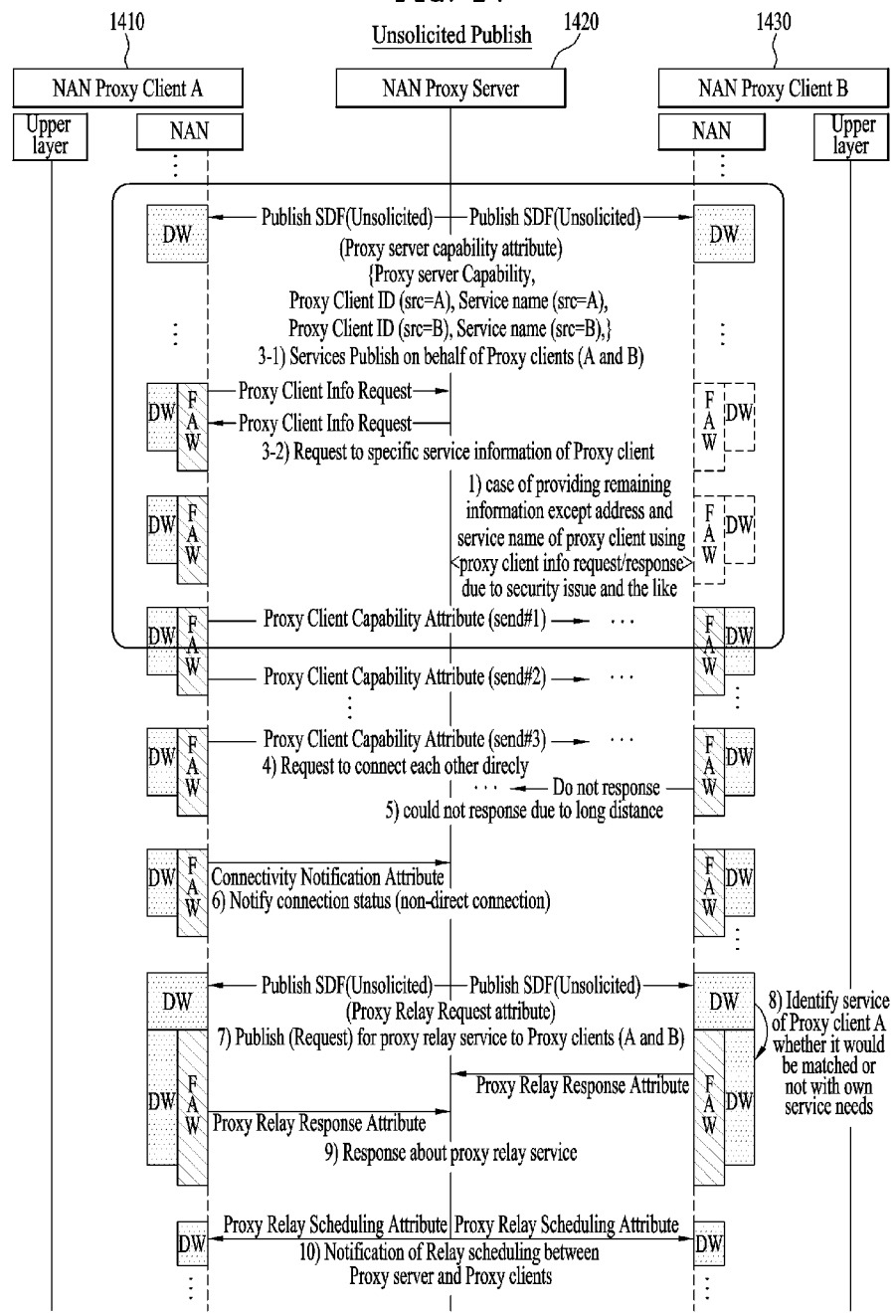
FIG. 14 is a diagram illustrating a method for a NAN proxy server to perform a role of a relay device.

FIG. 14 is a diagram illustrating a method for a NAN proxy server to perform a role of a relay device.

Referring to FIG. 14, a NAN proxy server 1420 can receive information from NAN proxy clients 1410/1430. The NAN proxy server 1420 can transmit a service discovery frame including proxy server attribute (or proxy server capability attribute) in which the information of the NAN proxy clients 1410/1430 is included to the NAN proxy clients 1410/1430 registered at the NAN proxy server.

In this case, if the NAN proxy server 1420 transmits the service discovery frame including all information of the NAN proxy clients 1410/1430, a security problem may occur. In particular, if the NAN proxy server 1420 broadcasts the service discovery frame including all information of the NAN proxy clients 1410/1430, information of the NAN proxy clients 1410/1430 can be easily exposed.

In this case, for example, if the information of the NAN proxy clients 1410/1430 included in the proxy server attribute is controlled, it may secure security. More specifically, it may include information capable of identifying the NAN proxy clients 1410/1430 only in a field included in the proxy server attribute field. In this case, for example, a NAN proxy client ID information field and a service name information field can be included only in the proxy server attribute. In particular, the proxy server attribute can include identification information on a NAN proxy client and a service only. And, for example, among a plurality of NAN proxy clients, a part of a plurality of the NAN proxy clients provides all information, whereas another part of a plurality of the NAN proxy clients provides client ID information and service name information only.

In this case, for example, among a plurality of the NAN proxy clients, a NAN proxy client including all information in the proxy server attribute may correspond to a normal type. On the other hand, a NAN proxy client including client ID information and information on a service name only in the proxy server attribute may correspond to a secure type. In particular, each of the NAN proxy clients can be configured to provide partial information only for security based on a service or application characteristic or a terminal characteristic, by which the present invention may be non-limited.

In this case, for example, if a first NAN terminal 1410 (NAN proxy client A) receives a proxy server attribute including information on a NAN proxy client ID and service name information, the first NAN terminal 1410 can transmit a proxy client info request to the NAN proxy server 1420. In particular, if the first NAN terminal 1410 wants to obtain additional information based on the NAN proxy client ID and the service name included in the proxy server attribute, the first NAN terminal 1410 can transmit the proxy client info request to the NAN proxy server 1420. In this case, the proxy client info request can include at least one field selected from the group consisting of an attribute ID field, a device ID (Proxy client) field, a device ID (Proxy server) field, and a request status field. Having received the proxy client info request, the NAN proxy server 1420 can transmit a proxy client info response to the first NAN terminal 1410 in response to the proxy client info request. In this case, the proxy client info response can include information on Table 28 in the following. In particular, the proxy client info response can include information on the NAN proxy server 1420 and information on the requesting proxy client. By doing so, the first NAN terminal 1410 can obtain information on a NAN proxy client 1430 (a second NAN terminal, a NAN proxy client B) with which a direct communication is to be performed and security can be enhanced as well.

TABLE 28

| Proxy client info response |
| --- |
| – Attribute ID |
| – Device ID (Proxy server) |
| – Device ID (Proxy client) |
| – MAC interface |
| – Publish mode |
| – Subscribe mode |
| – TBTT of Proxy server |
| – Requested Proxy Client ID |
| – Requested Proxy Client MAC interface |
| – Service info of Requested Proxy Client |
| – TBTT of Proxy Client |
| - Awake interval of Proxy Client |

And, for example, if a NAN proxy client registers at the NAN proxy server 1420, the NAN proxy server and the NAN proxy client can perform negotiation. In this case, it may be able to determine whether publishing is performed on all information or identification information only of the NAN proxy client. In this case, for example, the determination can be determined according to a vendor. As a different example, a plurality of NAN proxy clients can be published in a different form. For example, all information on a NAN proxy client not sensitive to security can be included in the proxy server attribute. On the contrary, in case of a NAN proxy client sensitive to security, information on a client ID and information on a service name of the NAN proxy client can be included in the proxy server attribute, by which the present invention may be non-limited.

Figure 15:
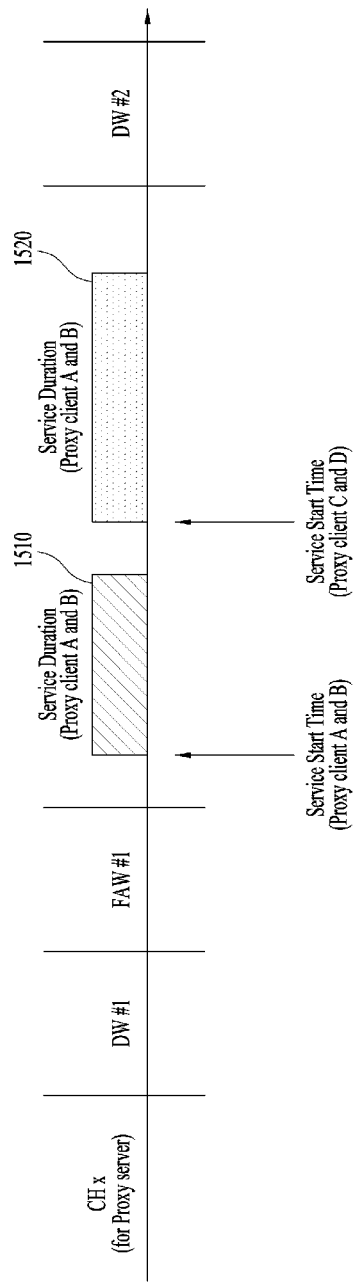
FIG. 15 is a diagram illustrating a method for a NAN proxy server to perform a role of a relay device based on a plurality of relay requestors.

FIG. 15 is a diagram illustrating a method for a NAN proxy server to perform a role of a relay device based on a plurality of relay requestors.

As mentioned in the foregoing description, the NAN proxy server can transmit a proxy relay scheduling attribute to the first and the second NAN terminals.

In this case, for example, a scheduling random rank included in the proxy relay scheduling attribute may have a different condition according to an access category (AC). In particular, the scheduling random rank may have a different condition according to a service or an application type. In this case, for example, the random rank can be configured as Table 24 in the following. In this case, Table 29 is just an example only. For example, a random rank value according to a service corresponds to a random value and can be defined based on a random value of EDCA (enhanced distributed channel access). And, for example, a random rank value may vary according to NAN topology, by which the present invention may be non-limited.

TABLE 29

| Scheduling Random Rank |
| --- |
| – Random Rank_AC[VO] (0, 7) |
| – Random Rank_AC[VI] (0, 15) |
| – Random Rank_AC[BE] (0, 31) |
| - Random Rank_AC[BK] (0, 31) |

For example, when a NAN proxy server 1520 plays a role of a relay for a plurality of NAN proxy clients, priority can be determined based on a random rank value. In this case, as mentioned in the foregoing description, each of a plurality of the NAN proxy clients may inform a NAN proxy server of a random rank value of the NAN proxy server via a scheduling random rank value included in a proxy relay response attribute. And, each of a plurality of the NAN proxy clients may have a random rank value according to AC of the NAN proxy client. In this case, a NAN proxy client having a smaller random rank value may preferentially access the NAN proxy server 1520.

In this case, for example, if two NAN proxy clients have the same random rank value, the NAN proxy server 1520 adjusts the random rank value in order not to make the same value.

In particular, if the NAN proxy server receives a proxy relay response attribute including the same scheduling random rank value from each of the NAN proxy clients, the NAN proxy server can adjust the random rank value.

In this case, an adjusted random rank value can be transmitted to each of the NAN proxy clients in a manner of being included in the proxy relay scheduling attribute. By doing so, relay priority for the NAN proxy clients can be determined.

For example, a random rank value shown in Table 30 may have a different value according to AC_VO (Voice), AC_VI (Video), AC_BE (Best Effort), and AC_BK (Background). In particular, the random rank value may have a different value according to a service or an application. In this case, for example, the random rank value corresponding to priority can be configured based on a characteristic of a service or a characteristic of an application, by which the present invention may be non-limited.

And, for example, the random value of the EDCA can be used for the compatibility with a legacy system. In particular, the random value of the EDCA may correspond to an available value based on the legacy system in the aspect of a NAN terminal.

In this case, the NAN terminal may borrow the value from the NAN proxy server for the purpose of determining relay priority. In particular, the relay priority can be determined using a legacy available parameter in consideration of the compatibility with a legacy system, by which the present invention may be non-limited.

And, for example, referring to FIG. 15, there may exist a NAN proxy client A and a NAN proxy client C as a relay requestor using the NAN proxy server. In this case, each of the NAN proxy clients can allocate a random rank value according to AC of the NAN proxy client via a proxy relay response attribute. In this case, for example, if a random rank value of the NAN proxy client A is smaller than a random rank value of the NAN proxy client C, the NAN proxy server can allocate scheduling to the NAN proxy client A with higher priority.

In this case, for example, the NAN proxy client A and the NAN proxy client B can perform data communication in a first period 1510 of a data path via a relay of the NAN proxy server. And, the NAN proxy client C and the NAN proxy client D can perform data communication in a second period 1520 of a data path via a relay of the NAN proxy server. In this case, for example, the first period 1510 and the second period 1520 may exist in the same data path. And, the first period 1510 may appear prior to the second period 1520 in time.

As a different example, the NAN proxy server can determine service start time of a channel of the NAN proxy server to be used by the NAN proxy clients based on a random rank value. In particular, the NAN proxy server can determine start timing of the first period 1510 and start timing of the second period 1520 based on a random rank value.

As a further different example, the NAN proxy server can determine service duration of the first period 1510 and the second period 1520. In this case, for example, the NAN proxy server can determine the duration of the first period 1510 based on AC of the NAN proxy client A. And, the NAN proxy server can determine the duration of the second period 1520 based on AC of the NAN proxy client C. In particular, the NAN proxy server can configure service duration time via a random rank value based on a service of each of the NAN proxy clients.

In this case, for example, service duration can be configured based on a TXOP (transmission opportunity) limit value. In this case, for example, the TXOP limit value can be represented as Table 27 in the following. In this case, the TXOP limit value may correspond to a value used as a TXOP limit value in a legacy system. In particular, a value previously used for the compatibility with a legacy system can be borrowed as a service duration value for relaying. The value is not restricted to TXOP limit values shown in the following table.

TABLE 30

| AC | TXOP Limit (802.11b) | TXOP Limit (802.11a/g/n) |
|---|---|---|
| BK | 3.264 ms | 2.064 ms |
| BE | 3.264 ms | 2.064 ms |

TABLE 30-continued

| AC | TXOP Limit (802.11b) | TXOP Limit (802.11a/g/n) |
|---|---|---|
| VI | 6.016 ms | 4.128 ms |
| VO | 3.264 ms | 2.064 ms |

In this case, for example, the NAN proxy server can repeatedly allocate service start time and service duration in every discovery window. In particular, the NAN proxy server can allocate the service start time and the service duration in every discovery window to relay data transmission while the NAN proxy server plays a role of a relay. In this case, for example, it may be able to configure an additional bit in a data block to indicate that all data are transmitted. For example, if data transmission ends, a NAN proxy client may allocate 1 to a more bit in a data block. In this case, if the end of the data transmission is indicated, the NAN proxy server is able to know that there is no data to be received. In this case, the NAN proxy server may terminate service duration allocation in a next discovery window. By doing so, the NAN proxy server can allocate a period for playing a role of a relay.

Figure 16:
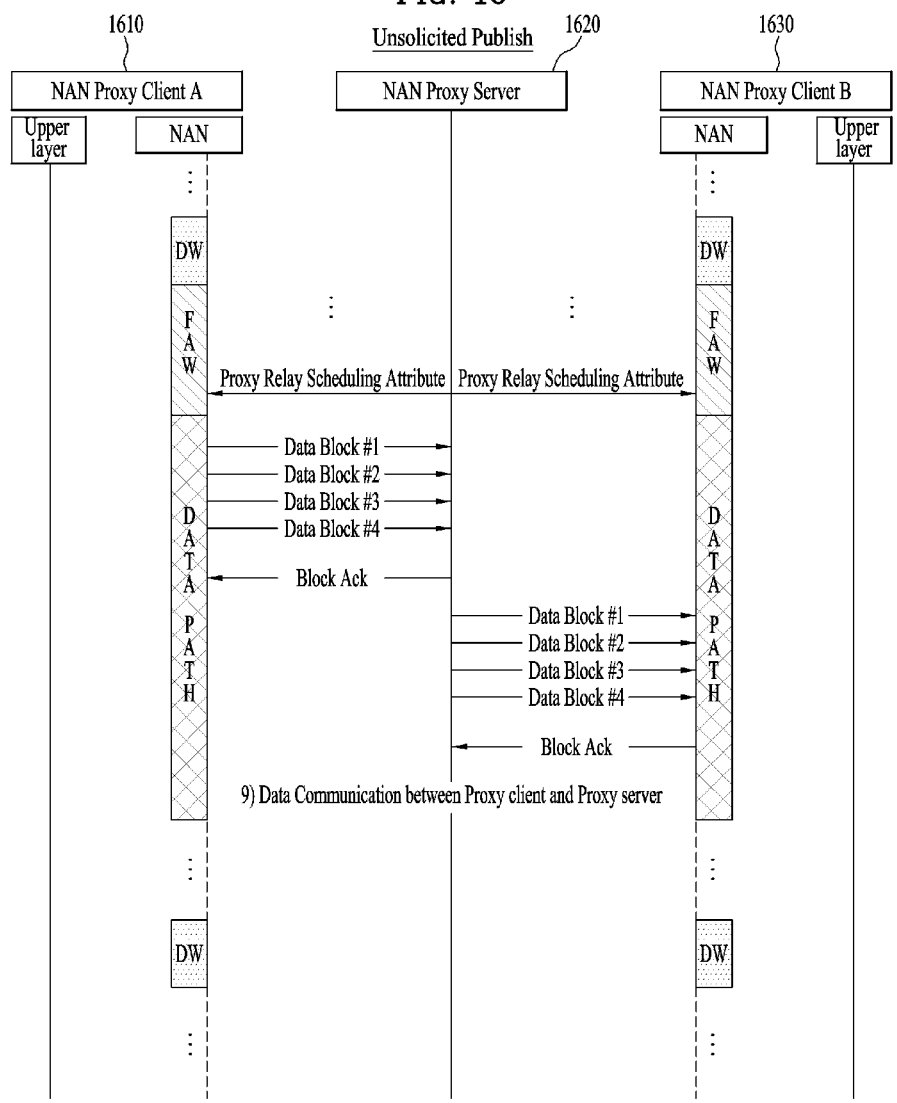
FIG. 16 is a diagram illustrating a method for a NAN proxy server to relay data communication as a relay device.

FIG. 16 is a diagram illustrating a method for a NAN proxy server to relay data communication as a relay device.

As mentioned in the foregoing description, a transmission order of relay requestors can be determined via a random rank value of proxy relay scheduling attribute.

In this case, for example, referring to FIG. 16, a first NAN terminal 1610 (NAN proxy client A) may correspond to a relay requestor of the earliest order. And, a second NAN terminal 1630 (NAN proxy client B) may correspond to a relay receiver corresponding to the first NAN terminal 1610.

In this case, the first NAN terminal 1610 can transmit a data block to a NAN proxy server 1620. In this case, for example, the first NAN terminal 1610 can transmit data to the NAN proxy server 1620 in a data path period.

In this case, since all scheduling information transmitted by the first NAN terminal 1610 are transmitted in a manner of being included in a proxy relay scheduling attribute, the first NAN terminal 1610 can perform data transmission based on the proxy relay scheduling attribute.

In particular, a data block size, a service interval, and service start time can be differently determined in advance and allocated according to a service or an application based on the proxy relay scheduling attribute. In this case, the first NAN terminal 1610 can perform data transmission based on the data block size, the service interval, and the service start time. Subsequently, the first NAN terminal 1610 can receive ACK or block ACK from the NAN proxy server 1620 in response to the data transmission.

And, for example, when the first NAN terminal 1610 transmits a data block, the first NAN terminal 1610 sets an additional bit to the last data block to indicate that all data are transmitted. For example, when data transmission ends, the first NAN terminal 1610 may allocate 1 to a more bit belonging to a data block. By doing so, the NAN proxy server 1620 is able to know that there is no data to be received from the first NAN terminal 1610. Subsequently, the NAN proxy server 1620 can transmit the data received from the first NAN terminal 1610 to the second NAN terminal 1630. In this case, the second NAN terminal 1630 can transmit ACK or block ACK to the NAN proxy server 1620 in response to the data transmission.

And, for example, when the NAN proxy server 1620 transmits a data block, the NAN proxy server 1620 sets an additional bit to the last data block to indicate that all data are transmitted. For example, when data transmission ends, the NAN proxy server 1620 may allocate 1 to a more bit belonging to a data block. By doing so, the second NAN terminal 1630 is able to know that there is no data to be received from the NAN proxy server 1620.

If the NAN proxy server 1620 receives ACK or block ACK form the second NAN terminal 1630, the NAN proxy server may terminate a relay role. Or, the NAN proxy server 1620 may relay data transmission to a relay requestor of a next order after a prescribed interval, by which the present invention may be non-limited.

Figure 17:
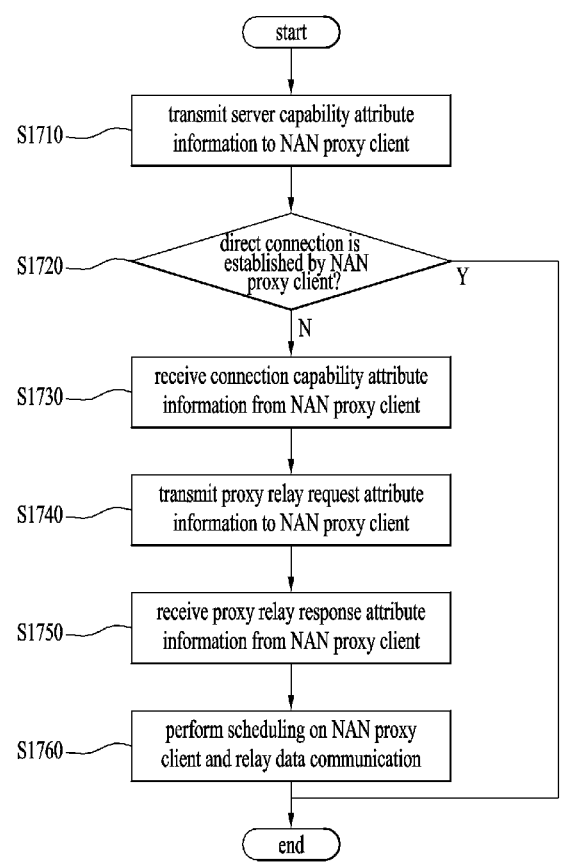
FIG. 17 is a flowchart of a method for a NAN proxy server to perform a role of a relay device.

FIG. 17 is a flowchart of a method for a NAN proxy server to perform a role of a relay device.

A NAN proxy server can transmit server capability attribute information (proxy server capability attribute or proxy server attribute) to a NAN proxy client [S1710]. In this case, as mentioned earlier in FIGS. 11 to 16, the server capability attribute information can be provided to a plurality of proxy clients. And, for example, the server capability attribute information can include information on NAN proxy clients registered at the NAN proxy server.

Subsequently, it may be able to determine whether or not a NAN proxy client establishes a direction connection [S1720]. IN this case, as mentioned earlier in FIGS. 11 to 16, the NAN proxy client can check a different NAN proxy client having a service preferred by the NAN proxy client using the information on the NAN proxy clients included in the server capability attribute information. Subsequently, the NAN proxy client can transmit proxy client capability attribute information to a NAN proxy client with which the NAN proxy client attempts to establish a direct connection. In this case, as mentioned in the foregoing description, it may fail to establish the direct connection due to signal strength, a distance problem, and the like. In this case, when the NAN proxy client transmits the proxy client capability attribute information N times, if the NAN proxy client fails to receive a response, it can be determined as the direct connection has failed.

Subsequently, if the direct connection fails, the NAN proxy server can receive connection capability attribute from the NAN proxy client [S1730]. In this case, as mentioned earlier in FIGS. 11 to 16, the connection capability attribute information can include information indicating that the NAN proxy client has failed to establish the direct connection. In particular, the NAN proxy server is able to check the direct connection failure information of the NAN proxy client via the connection capability attribute information.

Subsequently, the NAN proxy server can transmit proxy relay request attribute information to the NAN proxy client [S1740]. And, the NAN can receive proxy relay response attribute information from the NAN proxy client [S1750]. In this case, as mentioned earlier in FIGS. 11 to 16, the NAN proxy server can transmit the proxy relay request attribute information to the NAN proxy client to notify data communication relay. And, when the NAN proxy client intends to perform data communication using the NAN proxy server, the NAN proxy client can transmit the proxy relay response attribute information to indicate information on the use of a relay. In this case, for example, the proxy relay response attribute information can include a random rank value. A random rank can be determined based on a service or an application and, as mentioned in the foregoing description, the random rank may indicate priority for relaying.

Subsequently, the NAN proxy server performs scheduling on the NAN proxy client and may be able to relay data communication [S1760]. In this case, as mentioned earlier in FIGS. 11 to 16, the NAN proxy server can transmit proxy relay scheduling attribute information to a relay requestor and a relay receiver. In this case, the proxy relay scheduling attribute information can include scheduling information necessary for performing data relay. And, the proxy relay scheduling attribute information can include a random rank value. In this case, the random rank value can be used for priority of relaying.

Figure 18:
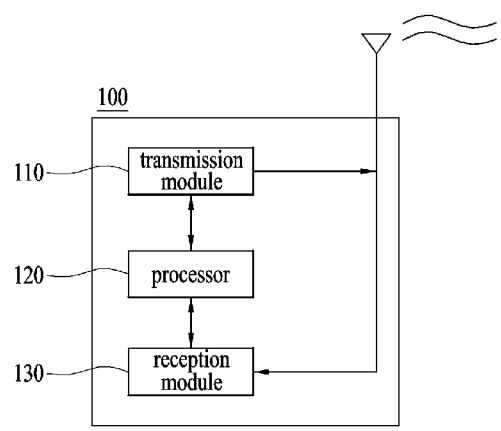
FIG. 18 is a block diagram for a terminal device.

FIG. 18 is a block diagram for a terminal device.

A terminal device may correspond to a NAN terminal. In this case, for example, the NAN terminal may correspond to a terminal playing a role of a NAN proxy server. And, the NAN terminal may correspond to a terminal playing a role of a NAN proxy client.

In this case, the terminal device 100 can include a transmission module 110 configured to transmit a radio signal, a reception module 130 configured to receive a radio signal, and a processor 120 configured to control the transmission module 110 and the reception module 130. In this case, the terminal 100 can perform communication with an external device using the transmission module 110 and the reception module 130. In this case, the external device may correspond to a different terminal device. And, the external device may correspond to a base station. In particular, the external device may correspond to a device capable of performing communication with the terminal device 100, by which the present invention may be non-limited. The terminal device 100 can transmit and receive digital data such as contents using the transmission module 110 and the reception module 130. And, the terminal device 100 can exchange a beacon frame, a service discovery frame, and the like using the transmission module 110 and the reception module 130, by which the present invention may be non-limited. In particular, the terminal device 100 performs communication using the transmission module 110 and the reception module 130 and may be able to exchange information with an external device.

According to one embodiment of the present specification, as mentioned in the foregoing description, the terminal device 100 may operate as a NAN proxy server or a NAN proxy client.

In this case, the processor 120 of the terminal device 100 can transmit server capability attribute information of the NAN proxy server to the NAN proxy client using the transmission module 110. In this case, if the NAN proxy client fails to establish a direct connection, the NAN proxy client can transmit connection capability attribute information to the NAN proxy server. In this case, the processor 120 can receive the connection capability attribute information from the NAN proxy client using the reception module 130. Subsequently, the processor 120 can transmit proxy relay request attribute information to the NAN proxy client using the transmission module 110. And, the processor 120 can receive proxy relay response attribute information from the NAN proxy client using the reception module 130. Subsequently, the processor 120 performs scheduling on the NAN proxy client and may be able to relay data communication to the proxy client.

The embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

And, both an apparatus invention and a method invention are explained in the present specification and the explanation on both of the inventions can be complementally applied, if necessary.

INDUSTRIAL APPLICABILITY

Although the present invention is explained under the assumption that the present invention is applied to a NAN wireless communication system, by which the present invention may be non-limited. The present invention can be applied to various wireless systems using the same scheme.

What is claimed is:

1. A method of relaying data communication relayed by a NAN (neighbor awareness networking) proxy server in a wireless communication system, the method comprising:
transmitting server capability attribute information of the NAN proxy server to a first NAN proxy client;
receiving connection capability attribute information from the first NAN proxy client;
transmitting proxy relay request attribute information to the first NAN proxy client;
receiving proxy relay response attribute information from the first NAN proxy client; and
performing scheduling on the first NAN proxy client and relaying data communication to the first NAN proxy client,
wherein the proxy relay request attribute information is transmitted when information on a direct connection failure is contained in the connection capability attribute information.

2. The method of claim 1,
wherein the first NAN proxy client transmits a message for a direct connection to a second NAN proxy client based on the server capability attribute information, and
wherein the information on the direct connection failure is contained in the connection capability attribute information when the first NAN proxy client fails to receive a response from the second NAN proxy client while the message is transmitted N times.

3. The method of claim 2,
wherein the N corresponds to a predetermined transmission count.

4. The method of claim 1,
wherein the server capability attribute information comprises information on NAN proxy clients registered at the NAN proxy server.

5. The method of claim 4,
wherein all information on NAN proxy clients of a first type among the NAN proxy clients are contained in the server capability attribute information, and
wherein only information on a client ID and a service name of NAN proxy clients of a second type among the NAN proxy clients are contained in the server capability attribute information.

6. The method of claim 5, further the method further comprising:
receiving a proxy client information request from the first NAN proxy client; and
transmitting a proxy client information response to the first NAN proxy client,
wherein the proxy client information response comprises all information on the NAN proxy clients of the second type.

7. The method of claim 5,
wherein the first type corresponds to a normal type and wherein the second type corresponds to a secure type.

8. The method of claim 1,
wherein proxy relay scheduling attribute information is transmitted to the first NAN proxy client when scheduling is performs on the first NAN proxy client.

9. The method of claim 8,
wherein the proxy relay scheduling attribute information comprises at least one selected from the group consisting of information on an attribute ID, information on a relay requester ID, information on a relay response ID, information on a scheduling random rank value, information on service start time, and information on a service interval.

10. The method of claim 9,
wherein the scheduling random rank value corresponds to a value determined based on an access category.

11. The method of claim 10,
wherein priority is determined based on the scheduling random rank value when a plurality of relay requestors request data relay to the NAN proxy server.

12. The method of claim 11,
wherein when the first NAN proxy client and a second NAN proxy client correspond to the relay requestors, if the scheduling random rank value of the first NAN proxy client is smaller than the scheduling random rank value of the second NAN proxy client, data relay for the first NAN proxy client is preferentially performed.

13. The method of claim 10, wherein the service interval is determined based on the scheduling random rank value.

14. The method of claim 1, wherein the data relay is completed when the NAN proxy server receives data from the first NAN proxy client based on the scheduling and transmits the received data to a second NAN proxy client.

15. A NAN proxy server relaying data communication in a wireless communication system, comprising:
a reception module configured to receive information from an external device;
a transmission module configured to transmit information to an external device; and
a processor configured to control the reception module and the transmission module,
wherein the processor is further configured to:
control the transmission module to transmit server capability attribute information of the NAN proxy server to a first NAN proxy client, control the reception module to receive connection capability attribute information from the first NAN proxy client,
control the transmission module to transmit proxy relay request attribute information to the first NAN proxy client,
control the reception module to receive proxy relay response attribute information from the first NAN proxy client,
perform scheduling on the first NAN proxy client and relay data communication to the first NAN proxy client,
wherein the proxy relay request attribute information is transmitted when information on a direct connection failure is contained in the connection capability attribute information.

* * * * *